United States Patent
Asano et al.

(10) Patent No.: US 8,619,212 B2
(45) Date of Patent: Dec. 31, 2013

(54) PROTECTIVE FILM, LOWER POLARIZING PLATE, LIQUID CRYSTAL DISPLAY PANEL, DISPLAY DEVICE, AND METHOD FOR PRODUCING PROTECTIVE FILM

(75) Inventors: Eiji Asano, Mihara (JP); Mitsuru Inoue, Okayama (JP); Katsunori Shintani, Hiroshima (JP); Daijiro Kodama, Mihara (JP); Keiko Kitano, Musashino (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 171 days.

(21) Appl. No.: 13/182,547

(22) Filed: Jul. 14, 2011

(65) Prior Publication Data
US 2012/0033155 A1    Feb. 9, 2012

(30) Foreign Application Priority Data

Jul. 16, 2010 (JP) .................................. 2010-162109
Aug. 31, 2010 (JP) .................................. 2010-194209

(51) Int. Cl.
*G02F 1/1335* (2006.01)

(52) U.S. Cl.
USPC .................................. 349/62; 349/96; 349/64

(58) Field of Classification Search
USPC ................... 349/96, 64, 62, 57, 65, 138, 122; 359/493.01; 428/141
See application file for complete search history.

(56) References Cited

U.S. PATENT DOCUMENTS

| | | | | |
|---|---|---|---|---|
| 6,447,135 | B1 * | 9/2002 | Wortman et al. | 362/623 |
| 7,119,873 | B2 * | 10/2006 | Kawanishi et al. | 349/194 |
| 2003/0001988 | A1 * | 1/2003 | Maeda et al. | 349/96 |
| 2009/0296021 | A1 * | 12/2009 | Lee et al. | 349/64 |
| 2009/0296023 | A1 * | 12/2009 | Lee et al. | 349/64 |

FOREIGN PATENT DOCUMENTS

JP          09-258013 A1    10/1997

* cited by examiner

*Primary Examiner* — Thoi Duong
(74) *Attorney, Agent, or Firm* — Burr & Brown, PLLC

(57) ABSTRACT

There is provided a protective film to be bonded to a polarizer to form a lower polarizing plate for a liquid crystal display panel. The protective film for a lower polarizing plate includes a matrix of a resin material and a diffusing component dispersed in the matrix. At least one-side surface, which is to face the polarizer, of the protective film is flat.

12 Claims, 12 Drawing Sheets

LIGHT GUIDE DIRECTION

PROTECTIVE FILM, LOWER POLARIZING PLATE, LIQUID CRYSTAL DISPLAY PANEL, DISPLAY DEVICE, AND METHOD FOR PRODUCING PROTECTIVE FILM

CROSS-REFERENCE TO RELATED APPLICATIONS

This application is based upon and claims the benefit of priority to Japanese Patent Application No. 2010-162109, filed on Jul. 16, 2010, and to Japanese Patent Application No. 2010-194209, filed on Aug. 31, 2010, the entire contents of which are incorporated herein by reference.

BACKGROUND OF THE INVENTION

1. Field of the Invention

The present invention relates to a protective film for a lower polarizing plate, which is to be bonded to a polarizer to form a lower polarizing plate for a liquid crystal display panel. In particular, the present invention relates to a protective film capable of changing the travel direction of light which has entered a liquid crystal display panel. The present invention also relates to a lower polarizing plate including the protective film, and to a liquid crystal display panel and a display device which include the lower polarizing plate.

Further, the present invention relates a method for producing a protective film for a lower polarizing plate, which is to be bonded to a polarizer to form a lower polarizing plate for a liquid crystal display panel. In particular, the present invention relates to a method for producing a protective film capable of changing the travel direction of light which has entered a liquid crystal display panel. The present invention further relates to a method for producing a lower polarizing plate for a liquid crystal display panel, in particular a lower polarizing plate capable of changing the travel direction of light which has entered a liquid crystal display panel.

2. Description of Related Art

A display device comprising a liquid crystal display panel and a surface light source device for illuminating the liquid crystal display panel from a back side, is in widespread use these days.

The surface light source device includes a light source and a number of optical sheets for changing the travel direction of light from the light source. As in the exemplary surface light source device 120 shown in FIG. 14, the optical sheets in most cases include a diffuser plate 28 and a light diffusing sheet 29 for diffusing light from the light source to obscure the image of the light source, and light condensing sheets 30, 35 which have a function (light condensing function) to condense light into the front direction so as to enhance the front-direction luminance.

On the other hand, the liquid crystal display panel includes a liquid crystal cell capable of controlling the orientation of a liquid crystal for each pixel, a lower polarizing plate disposed on the light entrance side (light incident side, light inputting side) of the liquid crystal cell, and an upper polarizing plate disposed on the light exit side (light outgoing side, light emerging side) of the liquid crystal cell. The pair of polarizing plates includes a polarizer which allows transmission of light of a particular polarization component and absorbs light of a component other than the particular polarization component, and a protective film bonded to the polarizer for protecting the polarizer.

In general, the protective film is comprised of a mere light-transmissive film due to cost constraints and does not positively exert an optical effect on transmitted light. As described e.g. in JP 9-258013A, there is a known protective film to which an optical function is imparted, but only to the extent that the surface of the protective film, on the side not facing a polarizer, is matted because of the constraints of the adhesion to the polarizer and the polarizer-protecting function. The entire contents of JP 9-258013A are incorporated herein by reference.

However, a sufficient diffusing function cannot be imparted to a protective film merely by matting the one surface of the protective film. On the other hand, the freedom of design of the luminance characteristics and the viewing angle characteristics of a display device can be significantly increased if a function to positively change the travel direction of light can be imparted to a protective film. Furthermore, the use of such a protective film could reduce the number of optical sheets incorporated into a surface light source device, making it possible to provide a thinner surface light source device and display device in addition to reducing the production cost.

SUMMARY OF THE INVENTION

The present invention has been made in view of the above situation. It is therefore an object of the present invention to provide a protective film capable of changing the travel direction of light which has entered a liquid crystal display panel. It is also an object of the present invention to provide a production method which can produce at a low cost a protective film for a lower polarizing plate, which is capable of changing the travel direction of light which has entered a liquid crystal display panel.

A first protective film according to the present invention is a protective film for a lower polarizing plate, the first protective film comprising:

a matrix of a resin material; and a diffusing component dispersed in the matrix, wherein the protective film for a lower polarizing plate is to be bonded to a polarizer so as to form a lower polarizing plate for a liquid crystal display panel, and wherein at least one-side surface, which is to face the polarizer, of the protective film is flat.

In the first protective film according to the present invention, the other-side surface opposite to the one-side surface may be a prism surface formed by arranged unit prisms.

A second protective film according to the present invention is a protective film for a lower polarizing plate, the second protective film comprising:

a matrix of a resin material; and a diffusing component dispersed in the matrix, wherein the protective film for a lower polarizing plate is to be bonded to a polarizer so as to form a lower polarizing plate for a liquid crystal display panel, and wherein one-side surface is to face the polarizer, and wherein the other-side surface opposite to the one-side surface is a prism surface formed by arranged unit prisms.

The first or second protective film according to the present invention may comprise a light diffusing portion including the matrix of a resin material and the diffusing component dispersed in the matrix, and a resin portion including no diffusing component.

In the first or second protective film according to the present invention, the light diffusing portion may be to be disposed between the polarizer and the resin portion.

The first or second protective film according to the present invention may have a plurality of unit prisms arranged in an arrangement direction which is parallel to a film plane of the protective film, each unit prism extending in a direction which is parallel to the film plane and which intersects the arrangement direction.

The first or second protective film may comprise a light diffusing portion including the matrix of a resin material and the diffusing component dispersed in the matrix, and a resin portion including no diffusing component; the unit prisms may be included in the resin portion; and the light diffusing portion may be to be disposed between the polarizer and the resin portion.

The first or second protective film according to the present invention may further comprise a second resin portion including no diffusing component and to be disposed between the polarizer and the light diffusing portion.

In the first or second protective film according to the present invention, the other-side surface opposite to the one-side surface may have unevenness formed due to the presence of the diffusing component.

In the first or second protective film according to the present invention, the other-side surface opposite to the one-side surface may have unevenness formed by molding.

The first or second protective film according to the present invention may be an extrudate produced by extrusion processing.

In the first or second protective film according to the present invention, the resin material of the matrix may be a polycarbonate resin.

The first or second protective film according to the present invention may have a haze value of not less than 60% and less than 100%.

The first or second protective film according to the present invention may have a moisture permeability of not less than 10 g/m$^2$·24 hr, as measured at a temperature of 40° C. and a humidity of 90% RH for 24 hours.

Alternatively, when a sheet-like test sample having a thickness of 80 μm is prepared using the same material as the first or second protective film according to the present invention, the sample may have a moisture permeability of not less than 10 g/m$^2$·24 hr, as measured at a temperature of 40° C. and a humidity of 90% RH for 24 hours.

A lower polarizing plate according to the present comprising:

a polarizer; and the protective film which is one the above-described first and second protective films according to the present invention and which is bonded to the light entrance side of the polarizer, wherein the lower polarizing plate is to be incorporated into a liquid crystal display panel.

The lower polarizing plate according to the present invention may further comprise an adhesive layer, provided adjacent to the polarizer and to the protective film, for bonding the polarizer and the protective film together.

In the lower polarizing plate according to the present invention, the protective film may have a moisture permeability of not less than 10 g/m$^2$·24 hr, as measured at a temperature of 40° C. and a humidity of 90% RH for 24 hours; and the adhesive layer may be a layer of a water-based adhesive.

Alternatively, in the lower polarizing plate according to the present invention, when a sheet-like test sample having a thickness of 80 μm is prepared using the same material as the protective film, the sample may have a moisture permeability of not less than 10 g/m$^2$·24 hr, as measured at a temperature of 40° C. and a humidity of 90% RH for 24 hours; and the adhesive layer may be a layer of a water-based adhesive.

A liquid crystal display panel according to the present invention comprises any one of the above-described lower polarizing plates according to the present invention.

A display device according to the present invention comprises the liquid crystal display panel according to the present invention, and a surface light source device for illuminating the liquid crystal display panel from a backside.

A protective film production method according to the present invention is a method for producing a protective film for a lower polarizing plate, comprising:

an extrusion step of heating and extruding a thermoplastic resin with a diffusing component to form a film material including a layer having the thermoplastic resin and the diffusing component dispersed in the thermoplastic resin; and a pressing step of passing the formed film material between a belt member and a molding roll disposed opposite to the belt member while pressing the film material therebetween, wherein in the pressing step the film material is pressed between the molding roll and the belt member in a zone of a length along a traveling path of the film material, and the film material is cooled in the zone in such a manner that the surface of a protective film, composed of the film material, which has been in contact with the belt member becomes a flat surface.

In the protective film production method according to the present invention, the following formula (a) may be satisfied:

$$0.16 \leq L/(F \times T) \times 100 \leq 0.96 \tag{a}$$

wherein L (mm) represents a length of the zone in which the film material is pressed between the molding roll and the belt member, F (mm/s) represents a traveling speed of the film material, and T (° C.) represents a temperature of the belt member.

In the pressing step of the protective film production method according to the present invention, the layer having the thermoplastic resin and the diffusing component dispersed in the thermoplastic resin may be kept in contact with the belt member while the film material passes between the molding roll and the belt member.

In the protective film production method according to the present invention, the layer having thermoplastic resin and the diffusing component dispersed in the thermoplastic resin may provide one surface of the protective film composed of the film material, and the one surface of the protective film may have a roughness Ra of not more than 0.9 μm, as measured according to JIS B0601 (1982).

In the protective film production method according to the present invention, the surface of the protective film, composed of the film material, which has been in contact with the belt member may have a roughness Ra of not more than 0.9 μm, as measured according to JIS B0601 (1982).

In the protective film production method according to the present invention, the surface of the protective film, composed of the film material, which has been in contact with the molding roll may have a roughness Ra of not more than 0.4 μm, as measured according to JIS B0601 (1982).

In the pressing step of the protective film production method according to the present invention, a second thermoplastic resin may also be heated and extruded to form the film material including said layer having the thermoplastic resin and the diffusing component dispersed in the thermoplastic resin, and a second layer having the second thermoplastic resin, laminated on said layer.

In the protective film production method according to the present invention, a protective film solely comprising said layer having the thermoplastic resin and the diffusing component dispersed in the thermoplastic resin may be produced.

In the protective film production method according to the present invention, after the pressing step, unevenness due to the presence of the diffusing component may be formed on the surface of the film material which has been in contact with the molding roll.

In the pressing step of the protective film production method according to the present invention, the surface of the film material, which is kept in contact with the molding roll, may be shaped by the molding roll into an uneven surface.

In the pressing step of the protective film production method according to the present invention, the surface of the film material, which is kept in contact with the molding roll, may be shaped by the molding roll into a prism surface constituted by arranged unit prisms. The unit prisms may be arranged in an arrangement direction parallel to the film plane of the film material, and each unit prism may extend in a direction which is parallel to the film plane and which intersects the arrangement direction.

In the protective film production method according to the present invention, the protective film composed of the film material may have a haze value of not less than 60% and less than 100%.

In the protective film production method according to the present invention, the protective film composed of the film material may have a moisture permeability of not less than 10 $g/m^2 \cdot hr$, as measured at a temperature of 40° C. and a humidity of 90% RH for 24 hours.

In the protective film production method according to the present invention, the thermoplastic resin may be a polycarbonate resin.

A lower polarizing plate production method according to the present invention comprises:

the step of bonding a polarizer to the protective film produced by any one of the above-described protective film production methods, wherein the polarizer is bonded to the film material from a side thereof which has been in contact with the belt member.

In the lower polarizing plate production method according to the present invention, the protective film and the polarizer may be bonded together by water bonding.

The lower polarizing plate production method according to the present invention may further comprise the step of cutting or punching a web-like material including the protective film and the polarizer bonded to each other, thereby sequentially producing lower polarizing plates.

In the bonding step of the lower polarizing film production method according to the present invention, the polarizer having a web-like or sheet-like shape and the protective film having a web-like shape may be bonded together.

The protective film for a lower polarizing plate according to the present invention can change the travel direction of light that has entered a liquid crystal display panel. The use of the protective film can therefore significantly increase the freedom of design of the luminance characteristics and the viewing angle characteristics of a display device.

Furthermore, according to the present invention, the protective film for a lower polarizing plate, which is capable of changing the travel direction of light that has entered a liquid crystal display panel, can be produced at a low cost. This makes it possible to increase the freedom of design of the luminance characteristics and the viewing angle characteristics of an actual display device.

DETAILED DESCRIPTION OF THE INVENTION

Figure 1:
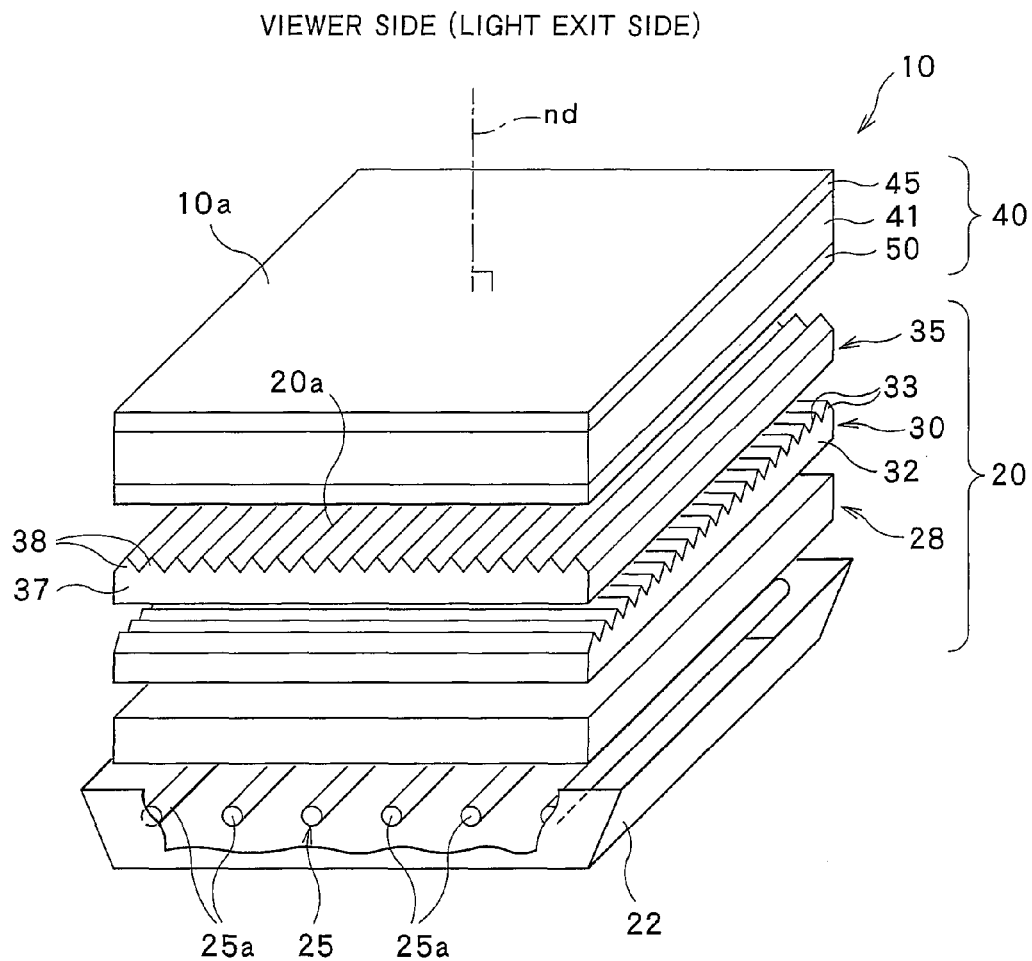
FIG. 1 is a perspective view showing the schematic construction of a display device, illustrating an embodiment of the present invention.

Preferred embodiments of the present invention will now be described with reference to the drawings. In the drawings attached to the present specification, for the sake of illustration and easier understanding, scales, horizontal to vertical dimensional ratios, etc. are exaggeratingly modified from those of the real things.

Figure 2:
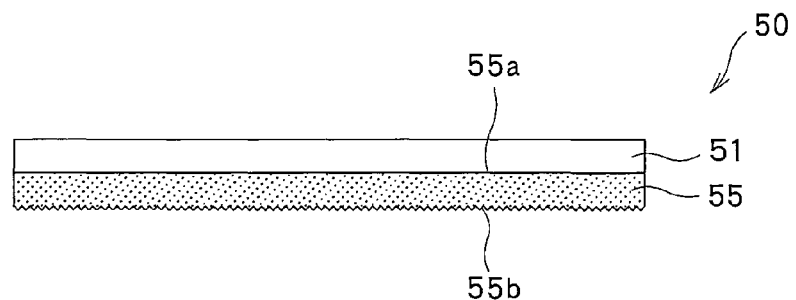
FIG. 2 is a sectional view showing a lower polarizing plate incorporated into the liquid crystal display panel of the display device of FIG. 1.
Figure 3:
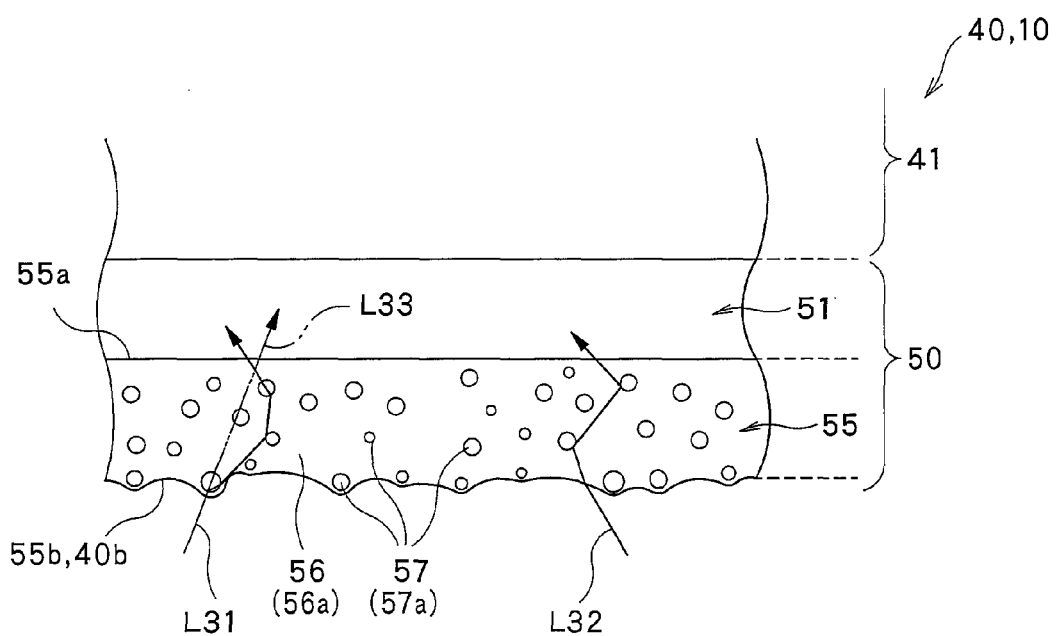
FIG. 3 is an enlarged view of a portion of FIG. 2, illustrating the action of the protective film of the lower polarizing plate.
Figure 4:
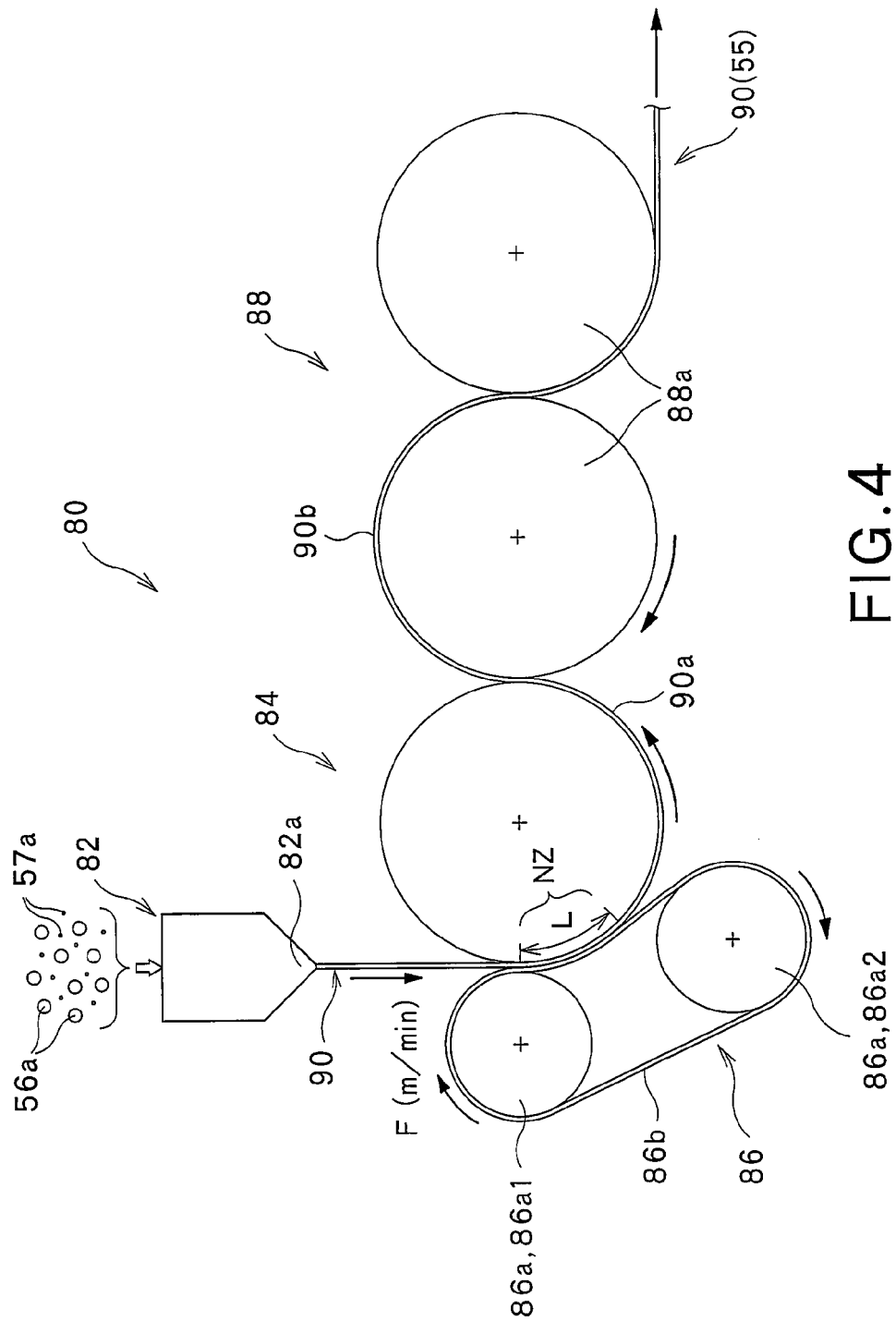
FIG. 4 is a diagram illustrating an exemplary method and exemplary apparatus for the production of a protective film.

FIGS. 1 through 4 are diagrams illustrating an embodiment of the present invention. Of these, FIG. 1 is a perspective view showing the schematic construction of a display device. FIGS. 2 and 3 are sectional views showing a lower polarizing plate in a section along the normal direction of the plate plane of the lower polarizing plate. FIG. 4 is a diagram illustrating an exemplary method for producing the protective film of the lower polarizing plate.

The display device 10 shown in FIG. 1 is a liquid crystal display device and includes a liquid crystal display panel 40, and a surface light source device 20 disposed on the back side (opposite to the viewer side) of the liquid crystal display panel 40. The surface light source device 20 is a device to illuminate the liquid crystal display panel 40 from the back side. The liquid crystal display panel 40 is a device which functions as a shutter that controls transmission and blocking of light from the surface light source device 20 for each pixel so as to form an image.

A known backlight of the direct-light type or the edge-light type may be used as the surface light source device 20. The surface light source device 20 shown in FIG. 1 is configured as a direct-light type backlight, and comprises a light source 25, a reflector 22 which covers the light source from the back side, and sheet-like optical members 28, 30, 35 disposed on the viewer side of the light source 25. The light source 25 is, for example, comprised of linear cold-cathode fluorescent lamps 25a arranged parallel to each other. As the sheet-like optical members are provided a diffuser plate 28, a first light condensing sheet 30 and a second light condensing sheet 35, which are arranged in this order from the light source side to the viewer side. As will be described later, various modifications may be made to the surface light source device 20. For example, two-dimensionally arranged LEDs may be used as the light emitters of the light source 25.

The diffuser plate 28 is a member for diffusing light from the light source 25 to even out variation in the brightness due to the construction of the light source 25. The diffuser plate 28, together with the light source 25 and the reflector 22, constitutes a backlight unit.

The two light condensing sheets 30, 35 are members for adjusting the luminance characteristics, and typically function to enhance the front-direction luminance. More specifically, the light condensing sheets 30, 35 change the travel direction of transmitted light so that the angle formed by the travel direction of transmitted light and the front direction nd tends to be smaller after exiting the light condensing sheets 30, 35 than before entering the light condensing sheets 30, 35.

The illustrated two light condensing sheets 30, 35 include sheet-like body portions 32, 37, and a plurality of unit optical elements 33, 38 arranged on the body portions 32, 37, respectively. The unit optical elements 33, 38 are arranged in an arrangement direction and extend in a straight line in a direction intersecting (in particular, perpendicular to) the arrangement direction. Each unit optical element 33, 38 has a triangular shape, projecting toward the light exit side, in a section perpendicular to the longitudinal direction. In this embodiment the first light condensing sheet 30 has the same construction as the second light condensing sheet 35.

The thus-constructed light condensing sheets 30, 35 each exert a light condensing effect mainly on a light component along a direction parallel to the arrangement direction of the unit optical elements 33 or 38. In the embodiment illustrated in FIG. 1, the arrangement direction of the unit optical elements of the first light condensing sheet 30 disposed on the light entrance side is perpendicular to the arrangement direction of the unit optical elements of the second light condensing sheet 35 disposed on the light exit side. Therefore, light that passes through the two light condensing sheets 30, 35 is condensed in two different directions. In the illustrated embodiment, the arrangement direction of the unit optical elements of the second light condensing sheet 35 disposed on the light exit side is parallel to the arrangement direction of the cold-cathode fluorescent lamps 25a constituting the light source 25.

By the thus-constructed sheet-like members 28, 30, 35, light emitted by the cold-cathode fluorescent lamps 25a of the light source 25 is deflected so that the in-plane distribution of brightness becomes uniform with the peak luminance in the front direction. This allows the surface light source device 20 to emit planar light from the light emitting surface 20a and effectively illuminate the liquid crystal display panel 40 with the light from the back side.

The term "light exit side (light outgoing side, light emerging side)" herein refers to downstream side (viewer side, upper side in FIG. 1) in the travel direction of light that travels from the light emitters 25a of the light source 25 toward a viewer, passing through the liquid crystal display panel 40, without turning back. The term "light entrance side (light incident side, light inputting side)" herein refers to upstream side in the travel direction of light that travels from the light emitters 25a of the light source 25 toward a viewer, passing through the liquid crystal display panel 40, without turning back.

The terms "sheet", "film" and "plate" are not used herein to strictly distinguish them from one another. Thus, the term "sheet" includes a member which can also be called a film or plate. For instance, a "protective film" includes a member which can also be called a "protective sheet".

The term "sheet plane (film plane, plate plane)" herein refers to a plane which coincides with the planar direction of an objective sheet-like member when taking a perspective and overall view of the sheet-like member. In this embodiment the sheet planes of the light condensing sheets 30, 35, the panel plane of the liquid crystal display panel 40, the plate plane of the below-described lower polarizing plate 50, the film plane of the bellow-described protective film 55, the display surface 10a of the display device 10, the light emitting surface 20a of the surface light source device 20, etc. are parallel to each other. The term "front direction" herein refers to a direction parallel to the normal direction nd of the display surface 10a of the display device 10.

The terms used herein to specify shapes or geometric conditions, such as "triangular shape", "parallel", "perpendicular", "symmetrical", etc., should not be bound to their strict sense, and should be construed to include equivalents or resemblances from which the same optical function or effect can be expected.

The terms "unit optical element", "unit shaped element", "unit prism" and "unit lens" herein refer to an element which functions to exert an optical effect, such as refraction or reflection, on light and to thereby change the travel direction of the light, and are not used herein to strictly distinguish them from one another. Similarly, the terms "prism" and "lens" are not used herein to strictly distinguish them from one another.

The liquid crystal display panel 40 will now be described. The liquid crystal display panel 40 includes a pair of polarizing plates 45, 50 and a liquid crystal cell 41 interposed between the polarizing plates 45, 50. The polarizing plates 45, 50 function to resolve incident light into two orthogonal polarization components, and allow transmission of one polarization component and absorb the other polarization component (absorption-type polarization separation function).

The liquid crystal cell 41 includes a pair of transparent substrates and a liquid crystal layer provided between the transparent substrates. An electric field can be applied to each pixel area of the liquid crystal layer. The orientation of the liquid crystal layer changes upon the application of electric field. For example, a polarization component in a particular direction (parallel to transmission axis), which has passed through the lower polarizing plate 50 disposed on the light entrance side, turns by 90 degrees when it passes through those pixel areas of the liquid crystal layer of the liquid crystal cell 41 to which an electric field is being applied, whereas the polarization component maintains its polarization direction when it passes through those pixel areas of the liquid crystal layer to which no electric field is being applied. Thus, transmission through or absorption and blocking by the upper polarizing plate 45, disposed on the light exit side of the lower polarizing plate 50, of the polarization component which has passed through the lower polarizing plate 50, can be controlled by application or no application of an electric field to the pixel areas of the liquid crystal layer. With reference to the "upper polarizing plate 45" and the "lower polarizing plate 50", the term "upper" herein refers to the light exit side, i.e. the viewer side, and the term "lower" refers to the light entrance side.

The lower polarizing plate 50 will now be described in greater detail with reference to FIGS. 2 and 3. The lower polarizing plate 50 includes a polarizer 51 capable of exerting a absorption-type polarization separation function, and a protective film 55 bonded to the polarizer 51. As shown in FIG. 3, the protective film 55 is laminated on the polarizer 51 on the side not facing the liquid crystal cell 41, i.e. the light entrance side, so as to protect the polarizer 51 from the outside.

An adhesive layer (not shown), disposed between and adjacent to the polarizer 51 and the protective film 55, may be provided for bonding the polarizer 51 and the protective film 55 together. Known various types of adhesives can be used to form the adhesive layer for increasing the adhesion between the polarizer 51 and the protective film 55. For example, a water-based adhesive including a polyvinyl alcohol resin as a main component may be used to form the adhesive layer. Adhesion herein refers to a concept including sticking and gluing. Similarly, an adhesive herein includes a sticking agent, a glue, and a bonding agent.

A variety of polarizers have heretofore been developed, and any of these can be used as the polarizer 51. For example, a polyvinyl alcohol film can be used as a base material for the polarizer 51. The polarizer 51 based on a polyvinyl alcohol film can be produced by absorbing or dyeing the polyvinyl alcohol film with a dichroism pigment, such as iodine or a dye, followed by uniaxial stretching for orientation of the film. Light absorption anisotropy can thus be imparted to the polarizer 51.

The protective film 55 will now be described. As well shown in FIG. 3, the protective film 55 includes a matrix (a main part) 56 of a resin material, and a diffusing component 57 dispersed in the matrix 56. Various resin materials having excellent optical properties, e.g. a polycarbonate resin, can be used for the matrix 56. A polycarbonate resin is preferred as a material for the polarizer 50 also from the viewpoint of low retardation.

The diffusing component 57, on the other hand, may be composed of particulate matter having a different refractive index from that of the matrix 56 or particulate matter having reflectivity. The particulate matter may be a metal compound or a porous material containing a gas, or may even be air bubbles. No particular limitation is imposed on the particle shape of the diffusing component 57 of particulate matter. Thus, the diffusing component 57 need not necessarily have a spherical particle shape as in the illustrate embodiment, and may have various particle shapes, such as a spheroidal shape or a linear shape.

Owing to the diffusing component 57 dispersed in the matrix 56, the protective film 55 can exert the effect of diffusing light. The degree of the diffusing effect of the protective film 55, produced by the diffusing component 57, can be adjusted in a wide range by suitably setting the resin material of the matrix 56, the thickness of the matrix 56, the construction of the diffusing component 57, the concentration of the diffusing component 57, etc. In particular, the haze value of the protective film 55 can be set at a level which will not usually be reached by merely matting the surface of a protective film, e.g. in the range of not less than 60% and less than 100%.

As shown in FIGS. 2 and 3, the light exit-side surface 55a of the protective film 55, which is to face the polarizer 51, is formed as a flat surface. This makes it possible to stably laminate and bond the protective film 55 and the polarizer 51 together while preventing entrainment of e.g. air. On the other hand, in this embodiment the light entrance-side surface 55b of the protective film 55, disposed on the side opposite to the side facing the polarizer 51, is formed as an uneven surface. The unevenness of the light entrance-side surface 55b are produced by the diffusing component 57 dispersed in the matrix 56. More specifically, the unevenness is formed by exposed particles of the diffusing component 57 or by protrusions conforming to the contours of particles of the diffusing component 57 lying immediately beneath the surface.

The light entrance-side surface 55b of the protective film 55 constitutes not only the light entrance-side surface of the lower polarizing plate 50 but also the light entrance-side surface 40b of the liquid crystal display panel 40. Thus, the protective film 55 of this embodiment exerts a diffusing effect not only due to the diffusing component 57 dispersed in the matrix 56 but also due to the unevenness of the light entrance-side surface 55b.

The term "flat", used for the polarizer 51-side surface 55a of the protective film 55, herein refers to such a degree of flatness as to ensure stable lamination and bonding of the protective film 55 and the polarizer 51. For example, the polarizer 51-side surface 55a of the protective film 55 can be regarded as flat if the center line average roughness Ra of the surface 55a, measured according to JIS B0601 (1982), is not more than 0.9 μm.

Because the light entrance-side surface 55b of the protective film 55 is flat despite the inclusion of the diffusing component 57 in the protective film 55, the protective film 55 and the polarizer 51 can be laminated and bonded together by so-called "water bonding". Specifically, the protective film 55 and the polarizer 51 are laminated together in the presence of water or an aqueous solution (or suspension) containing an appropriate additive such as a surfactant. This method can laminate the protective film 55 and the polarizer 51 together while preventing entrainment of foreign matter such as air. It is possible to positively bond the protective film 55 and the polarizer 51 together by adding an adhesive (e.g. glue) to the water or the aqueous solution (or suspension) or by providing an adhesive layer on at least one of the protective film 55 and the polarizer 51 in advance.

In order to promote removal of moisture from the protective film 55 and the polarizer 51 after "water bonding", the protective film 55 preferably has a moisture permeability of not less than 10 $g/m^2 \cdot 24$ hr, as measured at a temperature of 40° C. and a humidity of 90% RH. However, if the moisture permeability is too high, warpage or bending of the film can occur due to moisture absorption. The moisture permeability is therefore preferably not more than 400 $g/m^2 \cdot 24$ hr, as measured at a temperature of 40° C. and a humidity of 90% RH. The moisture permeability is herein determined by a cup method according to JIS Z0208.

An exemplary method for the production of the thus-constructed protective film 55 will now be described with reference mainly to FIG. 4. In the following embodiment, the protective film 55 is formed as an extrudate produced by extrusion processing.

An extruding apparatus 80 for use in the production of the protective film 55 will be described first. As shown in FIG. 4, the extruding apparatus 80 includes an extruder 82 having a die 82a, a molding roll 84, a backup means 86 disposed opposite to the molding roll 84, and a guide means 88 disposed downstream of the molding roll 84 and the backup means 86. The guide means 88 is comprised of a pair of guide rolls 88a.

The molding roll 84 has a cylindrical shape, and in this embodiment the peripheral surface of the cylindrical molding roll 84 is flat. However, when molding of the surface of an extrudate 90 is intended, it is possible to form a groove(s), corresponding to the intended shape, in the peripheral surface of the molding roll 84. The cylindrical molding roll 84 is rotatable about the axis of rotation that passes through the center of the cylinder.

The backup means 86 includes two or more support rolls 86a and an endless belt member (belt) 86b that extends between the support rolls 86a and that surrounds the support rolls 86a. In the illustrated embodiment, the backup means 86 includes two support rolls 86a. Each support roll 86a has a cylindrical shape and is rotatable about the axis of rotation that passes through the center of the cylinder. The axes of rotation of the support rolls 86a are parallel to each other, and are also parallel to the axis of rotation of the molding roll 84. The belt member 86b extending between the support rolls 86a can be driven by rotating the support rolls 86a on the axes of rotation.

In the illustrate embodiment, one of the two support rolls 86a is configured as a nip roll 86a1 disposed opposite to the molding roll 84. The other one of the two support rolls 86a is configured as an adjustment roll 86a2 for setting the traveling path of the belt member 86 between the adjustment roll 86a2 and the nip roll 86a1.

As shown in FIG. 4, the belt member 86a, extending between the nip roll 86a1 and the adjustment roll 86a2, deforms in conformity with the contour of the molding roll 84 by the pressure of the molding roll 84. Therefore, as will be described later, a film material 90, passing between the belt member 86b and the molding roll 84, is kept pressed between the belt member 86b and the molding roll 84 in a nip zone NZ of a certain length L along the traveling path of the film material 90. In the embodiment shown in FIG. 4, the length L of the nip zone NZ can be suitably adjusted e.g. by adjusting the positions of the support rolls 86a, especially the position of the adjustment roll 86a2.

Various materials can be used for the molding roll 84, the nip roll 86a1, the adjustment roll 86a2 and the belt member 86b. For example, a metal roll or a roll composed of a metal core and a surface portion of elastic material (e.g. rubber) can be used as the molding roll 84, the nip roll 86a1 or the adjustment roll 86a2. An endless metal belt having good durability, e.g. a belt of a metal alloy such as a chromium alloy or a nickel alloy, can be used as the belt member 86b.

A description will now be given of a method for producing the above-described protective film 55 by using the extruding apparatus 80. First, a thermoplastic resin (e.g. pelletized thermoplastic resin material) 56a for the matrix 56 and particulate matter 57a for the diffusing component 57 are fed into the extruder 82. The thermoplastic resin 56a is heated in the extruder 82 to a temperature above the glass transition temperature whereby the resin is softened, and the soften resin is extruded by the extruder 82.

For instance, when a polycarbonate resin having a glass transition temperature of around 140° C. is used as the thermoplastic resin 56a for the matrix 56 of the protective film 55, the thermoplastic resin 56a may be heated in the extruder 82 in such a manner that the temperature of the thermoplastic resin 56a becomes about 300° C. immediately after it passes through the die 82a. When the protective film 55 is produced by extrusion, the average particle size (arithmetic average of the equivalent volume diameters) of the particulate matter 57a for the diffusing component 57 may be made to be 1 to 12 µm, and the content of the particulate matter 57a may be made to be more than 0% by weight and not more than 40% by weight.

In this manner, a film material 90 having the thermoplastic resin 56a and the diffusing component 57 dispersed in the thermoplastic resin 56a is formed as an extrudate. The thickness of the film material 90 can be controlled at a desired thickness at the die 82a of the extruder 82.

As will be described later, it is also possible to form a film material 90 by co-extrusion so that the film material 90 may includes a layer containing the thermoplastic resin 56a and the diffusing component 57 dispersed in the thermoplastic resin 56a, and a second layer laminated on the layer. However, for better understanding of the present invention, a description is here given of the formation as an extrudate of the film material 90, solely including a layer (herein also called diffusing layer) having the thermoplastic resin 56a and the diffusing component 57 dispersed in the thermoplastic resin 56a, to produce the protective film 55 shown in FIG. 2.

The film material 90 extruded from the extruder 82 travels between the molding roll 84 and the backup means 86 while the molding roll 84 is rotating at a peripheral speed synchronized with the traveling speed F (mm/s) of the film material 90, and the belt member 86b of the backup means 86 is traveling at a speed synchronized with the traveling speed of the film material 90. The molding roll 84 is disposed opposite to the nip roll 86a1 of the backup means 86, and is positioned so that the film material 90 is pressed between the molding roll 84 and the belt member 86b on the nip roll 86a1. Further, the adjustment roll 86a2 of the backup means 86 is positioned so that the belt member 86b, extending between the adjustment roll 86a2 and the nip roll 86a1, deforms in conformity with the contour of the molding roll 84. Accordingly, while the film material 90 passes between the belt member 86b and the molding roll 84, it is supported by the belt member 86b and the molding roll 84. Further, the film material 90 is kept pressed between the belt member 86b and the molding roll 84 while it travels through the zone NZ of a predetermined length L starting from the position between the molding roll 84 and the nip roll 86a1.

The thickness of the film material 90 can be adjusted by pressing the film material 90 between the belt member 86b and the molding roll 84. Further, because the film material 90 is kept pressed over a period of time during which it travels through the zone NZ of a certain length L, the particulate matter 57a for the diffusing component 57 can be stably pressed into the inside of the thermoplastic resin 56a.

The temperature of the molding roll 84 and the temperature T of the belt member 86b are usually lower than the temperature of the film material 90 extruded from the extruder 82. Accordingly, while the film material 90 is in contact with and pressed between the belt member 86b and the molding roll 84, the film material 90 loses heat to the belt member 86b and the molding roll 84. Thus, the film material 90 is positively cooled while it is pressed between the belt member 86b and the molding roll 84.

The heat capacity of the belt member 86b is low as compared to the molding roll 84. Accordingly, though the belt member 86b absorbs heat from the film material 90, the belt member 86b easily releases heat when it is not in contact with the film material 90. Therefore, the temperature of the belt member 86b is sufficiently low when it again comes into contact with the film material 90, which promotes cooling of the film material 90. The belt member 86 can therefore sufficiently cool the film material 90 from the side in contact with the belt member 86 so that when the film material 90 leaves the belt member 86b of the backup means 86, the temperature of the film material 90 has reached a temperature below the glass transition temperature of the thermoplastic resin 56a not only in the belt member 86b-side surface portion but in the inside portion of the film material 90 as well.

Consequently, no large temperature decrease will occur subsequently on the side of the surface 90a of the film material 90 which has been in contact with the belt member 86b. Further, when the temperature of the film material 90 has been lowered to a temperature below the glass transition temperature of the thermoplastic resin 56a, the thermoplastic resin 56a has a certain degree of deformation resistance. Therefore, a significant thermal deformation of the film material 90 due to the difference in the coefficient of thermal expansion between the thermoplastic resin 56a and the particulate matter 57a is unlikely to occur. Accordingly, after the film material 90 is released from the pressure of the belt member 86a and the molding roll 84, the portion of the thermoplastic resin 56a (the matrix 56 of the protective film 55) of the film material 90 can be prevented from being contracted. This can prevent the contours of particles of the particulate matter 57a (diffusing component 57) from protruding from the surface 90a of the film material 90 which has been in contact with the belt member 86b, making it possible to keep the surface 90a flat.

In this regard, it has been found through the present inventors' studies that if the following formula (b) is satisfied, the surface 90a of the film material 90, having the thermoplastic resin 56a containing the diffusing component 57 (particulate matter 57a), which has been in contact with the belt member 86b can be kept flat even after the film material 90 is cooled to room temperature:

$$0.16 \leq L/(F \times T) \times 100 \leq 0.96 \tag{b}$$

wherein "L" represents the length (mm), along the traveling path of the film material 90, of the zone NZ in which the film material 90 is pressed between the molding roll 84 and the belt member 86a, "F" represents the traveling speed (mm/s) of the film material 90, and "T" represents the temperature (° C.) of the belt member 86b.

The value "L/(F×T)×100" increases with increase in the ability of the belt member 86b to cool the film material 90 including the thermoplastic resin 56a including the diffusing component 57 (particulate matter 57a). When the value "L/(F×T)×100" was lower than 0.16, the temperature of the film material 90 on the side in contact with the belt member 86a did not decrease sufficiently, and unevenness, conforming to the shapes of particles of the diffusing component 57, was formed on the surface of the protective film 55, composed of the film material 90, which had been in contact with the belt member 86b. Further, it was possible that even the temperature of the surface 90a of the film material 90 in contact with the belt member 86b might not decrease sufficiently, whereby the film material 90 could not separate from the belt member 86b smoothly, which resulted in the formation of a stripe pattern (lateral steps) on the surface 90a of the film material 90 which had been in contact with the belt member 86b approximately along the width direction of the film material 90, perpendicular to the travel direction of the film material 90. On the other hand, when the value "L/(F×T)×100" exceeded 0.96, the ability of the belt member 86b to cool the film material 90 greatly differed from the cooling ability of the molding roll 84, which might result in the occurrence of large nonremovable deformation, such as warpage or bending, in the film material 90 (protective film 55).

When the formula (b) was satisfied, bending or warpage, if occured in the film material 90, could be corrected or removed by the guide means 88, as will be described later. Further, when the film material 90 (protective film 55) was produced in such a manner as to satisfy the formula (b), using those conditions and materials which were commonly employed in the production of a transparent optical film by extrusion processing, the temperature of the film material 90, at least at the surface 90a in contact with the belt member 86a, could be decreased to a temperature below the glass transition temperature Tg of the thermoplastic resin 56a, or even to a temperature not more than 90 percent of the glass transition temperature Tg of the thermoplastic resin 56a (i.e. temperature of not more than (Tg×0.9)) while the film material 90 passed between the belt member 86b and the molding roll 86.

The surface 90a of the protective film 55 composed of the film material 90, which had been in contact with the belt member 86b, could eventually be made flat. This made it possible to laminate and bond the protective film 55 and the polarizer 51 together by so-called "water bonding", as described above. In particular, as also described in Examples below, when the film material 90 (protective film 55) was produced by using those conditions and materials which were commonly employed in the production of a transparent optical film by extrusion processing, the surface 90a of the film material 90 produced (protective film 55) which had been in contact with the belt member 86b had a roughness Ra of not less than 0.05 μm and not more than 0.9 μm, as measured according to JIS B0601 (1982).

On the other hand, the molding roll 84 has a much larger heat capacity than the belt member 86b, and is heated in most cases. There is, therefore, a case in which the molding roll 84 has a smaller effect on the cooling of the film material 90 than the endless belt 86b of the backup means 86.

In such a case, at the time when the film material 90 leaves the molding roll 84, the temperature of the film material 90 has decreased to a temperature below the glass transition temperature of the thermoplastic resin 56a only in the molding roll 84-side surface portion, whereas the interior temperature of the film material 90 is still above the glass transition temperature. Consequently, a large temperature decrease across the glass transition temperature of the thermoplastic resin 56a for the matrix 56 subsequently occurs in the film material 90 on the side of the surface 90b which has been in contact with the molding roll 84. This causes thermal deformation in the film material 90 due to the difference in the coefficient of thermal expansion between the thermoplastic resin 56a for the matrix 56 and the particulate matter 57a for the diffusing component 57. Typically, in the surface 90b of the film material 90 which has been in contact with the molding roll 84, the portion of the thermoplastic resin 56a for the matrix 56 contracts whereby the contours of particles of the particulate matter 57a for the diffusing component 57 protrude. Thus, as shown in FIGS. 2 and 3, unevenness, conforming to the shapes of particles of the diffusing component 57, is formed on the surface 90b of the resulting protective film 55 which has been in contact with the molding roll 84.

After leaving the molding roll 84, the film material 90 is guided by the guide means 88 while the film material 90 is cooled by the guide means 88 and, at the same time, appropriate tension is applied by the guide means 88 to the film material 90 to correct warpage or bending. The protective film 55, composed of the film material 90 which is an extrudate of a mixture of the thermoplastic resin 56a and the particulate matter 57a as the diffusing component 57, is thus produced. The surface 90a of the film material 90 which has been in contact with the belt member 86b of the backup means 86 makes the flat light exit-side surface 55a of the protective film 55, while the surface 90b of the film material 90 which has been in contact with the molding roll 84 makes the irregular light entrance-side surface 55b of the protective film 55.

According to the above-described production method, when the film material 90, the extrudate including the diffusing component 57, passes through the zone NZ of a certain length L, the film material 90 is pressed between the molding roll 84 and the belt member 86b and cooled in such a manner that the surface 90a of the film material 90, which is in contact with the belt member 86b, eventually becomes a flat surface. According to the production method, the film material 90 (protective film 55), including the diffusing component 57 and whose at least one surface is made flat, can be produced by extrusion at a low cost.

Further, according to the above-described production method, a web-like protective film 55 (web-like film material 90) can be produced. By bonding sheet-like polarizers 51, which has a size corresponding to either one or a plurality of lower polarizing plate 50 to be produced, sequentially to the web-like protective film 55 or by laminating a web-like polarizer 51 to the web-like protective film 55, a web-like material, consisting of a large number of lower polarizing plates 50 joined one another, is produced. The lower polarizing plates 50 are obtained sequentially by sequentially cutting (or otherwise machining such as punching) the web-like material.

Thus, according to the above-described production method, a web-like protective film 55 can be produced and, through roll-to-roll handling of the protective film 55, lower polarizing plates 50 can be produced efficiently. The above-described method therefore not only enables the low-cost production of the protective film 55 but also enables the easy production of the lower polarizing plate 50 by the use of the protective film 55, thus making it possible to produce the lower polarizing plate 50 at a considerably low cost.

In the protective film 55 produced in this embodiment, the one surface (light exit-side surface) 55a which is to face the polarizer 51 is formed as a flat surface, whereas the other surface (light entrance-side surface) 55b is formed as an uneven surface, as shown in FIGS. 2 and 3. In particular, the surface of the film material 90 which has been in contact with the belt member 86b is made a flat surface, whereas the surface of the film material 90 which has been in contact with the molding roll 84 is made an uneven surface. However, not only the surface of the film material 90 which has been in contact with the belt member 86b, but the surface of the film material 90 which has been in contact with the molding roll 84 can also be formed as a flat surface by increasing the ability of the molding roll 84 to cool the film material 90 as an extrudate.

In cases where no positive molding of the film material 90 is performed by the molding roll 84 as in the above-described embodiment, there is no need to keep the molding roll 84 at a high temperature for the purpose of increasing the molding rate. Thus, it is possible to significantly increase the ability of the molding roll 84 to cool the film material 90. This makes it possible to form the surface of the protective film 55, composed of the film material 90, which has been in contact with the molding roll 84 as a flat surface. Specifically, when the film material 90 (protective film 55) was produced by using those conditions and materials which were commonly employed in the production of a transparent optical film by extrusion processing, the surface of the film material 90 produced (protective film 55) which had been in contact with the molding roll 84 could be made to have a roughness Ra of not less than 0.01 μm and not more than 0.4 μm, as measured according to JIS B0601 (1982).

The operation of the display device 10 attributable to the protective film 55 will now be described with reference mainly to FIG. 3.

Referring to FIG. 1, light emitted by the light source 25 travels toward the viewer side directly or after reflecting on the reflector 22, and enters the diffuser plate 28, where the light is isotropically diffused. The in-plane distribution of brightness is equalized by the isotropic diffusion of light in the diffuser plate 28. The light diffused by the diffuser plate 28 then enters the first light condensing sheet 30.

Light that has entered the first light condensing sheet 30 is refracted at the light exit-side surface (prism surface) of the unit optical elements 33 when the light exits the first light condensing sheet 30. Due to the refraction, light traveling in a direction inclined from the front direction nd is mainly bent such that the angle of the travel direction (exit direction) of the light with respect to the front direction nd becomes smaller as compared to the travel direction of the light immediately before entering the first light condensing sheet 30. The first light condensing sheet 30 thus exerts a light condensing effect on light from the light source 25. The first light condensing sheet 30 mainly condenses a light component traveling along the arrangement direction of the unit optical elements 33 of the first light condensing sheet 30.

Light that has exited the first light condensing sheet 30 then enters the second light condensing sheet 35. As with the first light condensing sheet 30, the second light condensing sheet 35 exerts a light condensing effect (light collecting effect) on light passing through the second light condensing sheet 35. The second light condensing sheet 35 mainly condenses a light component traveling along the arrangement direction of the unit optical elements 38 of the second light condensing sheet 35, i.e. a light component perpendicular to the light component condensed by the first light condensing sheet 30. Therefore, the angular distribution of luminance can be regulated in planes along the two different directions by making light pass through the two light condensing sheets 30, 35.

In this manner, light from the light source 25 exits the light emitting surface 20a of the surface light source device 20, constituted by the light exit-side surface of the second light condensing sheet 35, and the surface light source device 20 two-dimensionally illuminates the liquid crystal display panel 40 accordingly. The liquid crystal display panel 40 allows transmission therethrough of light from the surface light source device 20 selectively for each pixel, so that a viewer can view an image on the liquid crystal display device 10.

In this embodiment the protective film 55 of the lower polarizing plate 50 exerts a diffusing action. In particular, the protective film 55 includes the matrix 56 and the diffusing component 57 dispersed in the matrix 56. Diffusion of light caused by the diffusing component 57 contained in the protective film 55 is far superior in the degree and the quality (uniformity of diffusion) to diffusion of light caused by matting of the surface of a protective film by molding or by fixing of particulate matter on the surface with a binder resin. Thus, in the case of a protective film merely having a matted surface, there exists light L33 which passes through the protective film without a change in the travel direction as shown by the two-dot chain line in FIG. 3. On the other hand, the diffusing component 57 is dispersed in the protective film 55 of this embodiment not only in the planar direction but also in the thickness direction. Light L31 and light L32, which have not been diffused sufficiently by the surface unevenness of the light entrance-side surface 55b, may be later refracted at the interface between the matrix 56 and a particle of the diffusing component 57 or reflected on the surface of a particle of the diffusing component 57. The traveling directions of such lights can thus be changed.

In this manner, light from the surface light source device 20 can be diffused to some degree in the protective film 55. This can change the profile of the angular distribution of luminance after condensing of light by the two light condensing sheets 30, 35 to a gentler one.

As described above, the use of the light condensing sheets 30, 35 can change the angular distribution of luminance such that by refraction of light at the unit optical elements 33, 38, the front-direction luminance increases selectively. On the other hand, the use the light condensing sheets 30, 35 can cause problems such as cut-off (a phenomenon where as the observation angle (angle of observation direction with respect to the front direction nd) increases, the perceived brightness of an image rapidly drops at a certain observation angle) and side lobe (a phenomena where in the angular distribution of luminance, a second peak appears in an angular region highly inclined from the front direction). Such problems are likely to occur especially when, as in the illustrated embodiment, the unit optical elements 33, 38 of the light condensing sheets 30, each have a triangular sectional shape in a section perpendicular to the longitudinal direction. In order to eliminate or alleviate such problems, a conventional display device as shown in FIG. 14, which uses a lower polarizing plate 150 including no diffusing component, often has a diffuser sheet 29 having a diffusing function, disposed on the light exit side of the light exit-side second light condensing sheet 35 in the surface light source device 120.

In this embodiment, on the other hand, the lower polarizing plate 50 of the liquid crystal display panel 40 includes the protective film 55 which can exert an excellent diffusing effect and the degree of the diffusing effect of which can be adjusted over a wide range. By adjusting the diffusing effect of the protective film 55 so that it can exert the same degree of diffusing effect as the diffuser sheet 29 of the conventional surface light source device 120, it becomes possible to eliminate the diffuser sheet 29 from the surface light source device 120 while maintaining the optical characteristics of the overall display apparatus. Thus, the number of sheet-like members in the display device 10 (surface light source device 20) can be reduced. This can directly reduce the production cost of the display device 10 (surface light source device 20) and can make the display device 10 (surface light source device 20) thinner.

Figure 14:
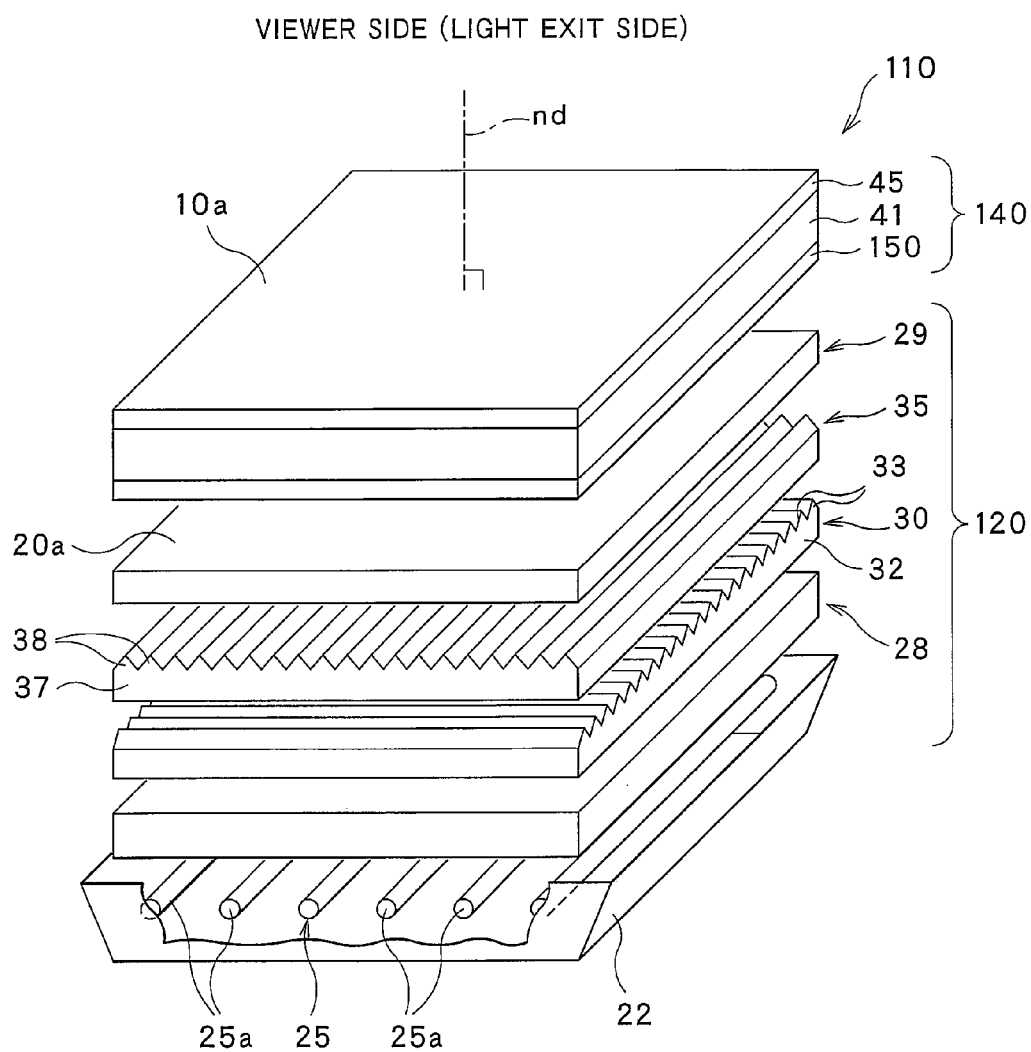
FIG. 14 is a perspective view corresponding to FIG. 1, showing a conventional display device.

Except for the inclusion of the diffuser sheet 29 and the different construction of the lower polarizing plate 150, the conventional display device 110 shown in FIG. 14 has the same construction as the above-described display device 10 shown in FIG. 1. Therefore, the same reference numerals as used for the above-described embodiment are used to indicate the same elements or members of the conventional display device 110 shown in FIG. 14, and a duplicate description thereof is omitted.

As described hereinabove, according to this embodiment, the protective film 55 for the lower polarizing plate 50 includes the matrix 56 and the diffusing component 57 dispersed in the matrix 56, and at least one surface 55a of the protective film 55 is flat. Accordingly, the function of positively changing the travel direction of light can be imparted to the protective film 55 and, in addition, the protective film 55 can be stably laminated and bonded onto the polarizer 51. Further, the protective film 55 can be produced by extrusion processing at a low cost. The use of the protective film 55 of this embodiment can therefore significantly increase the freedom of design of the luminance characteristics and the viewing angle characteristics of the display device 10. Furthermore, there is a possibility that the use of the protective film 55 could reduce the number of sheet-like optical members (optical sheets) incorporated into the surface light source device 20. This makes it possible to make the surface light source device 20 and the display device 10 thinner in addition to reducing the production cost.

Various changes and modifications may be made to the above-described embodiments. Some variations will now be described with reference to the drawings. In the drawings referred to in the following description, the same reference numerals are used for the same members or elements as used in the above-described embodiments, and a duplicate description thereof will be omitted.

Though in the above-described embodiment the protective film 55 is produced which has unevenness, corresponding to the diffusing component 57, on the light entrance-side surface 55b, it is also possible to make both surfaces of the protective film 55 flat by adjusting the cooling ability of the molding roll 84 as described previously.

Figure 5:
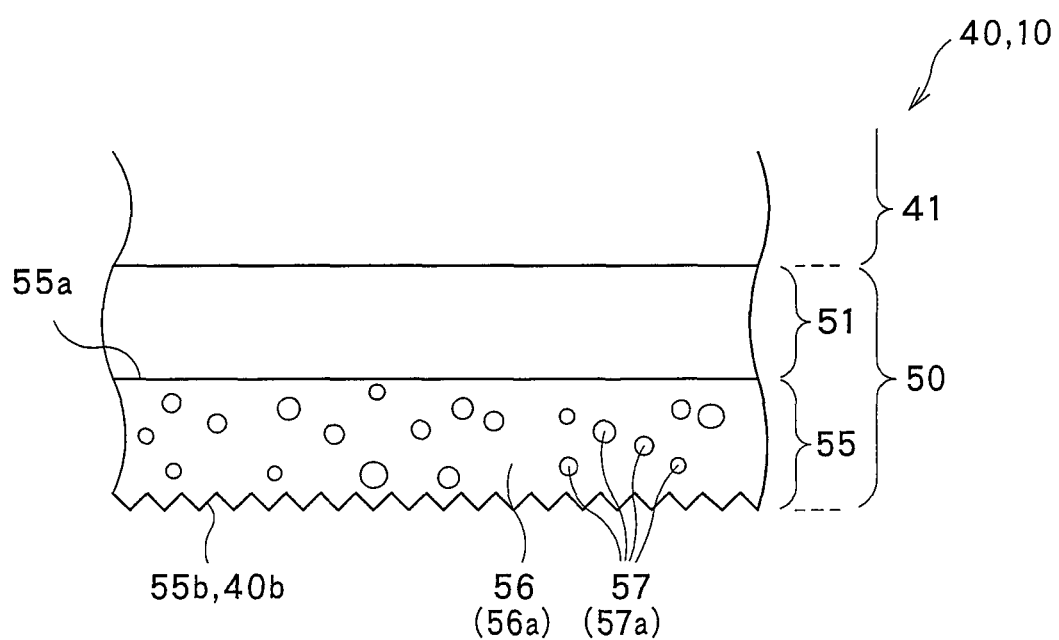
FIG. 5 is a diagram corresponding to FIG. 3, illustrating a variation of the protective film and the lower polarizing plate.

Though in the above-described embodiment unevenness is formed on the light entrance-side surface 55b of the protective film 55 due to the presence of the diffusing component 57, i.e. due to protrusion of the contours of particles of the diffusing component 57, it is possible to form unevenness on the light entrance-side surface 55b of the protective film 55 e.g. by molding. When a molding roll 84, having a three-dimensional pattern formed on the peripheral surface, is used in the above-described protective film production method, the three-dimensional pattern of the molding roll 84 is transferred to the surface 90b of the film material 90, which has been in contact with the molding roll 84, thereby forming the unevenness (three-dimensional pattern) on the surface 90b of the film material 90 (i.e. the light entrance-side surface 55b of the protective film 55). In the case of forming unevenness (three-dimensional pattern) on the light entrance-side surface 55b of the protective film 55 by molding, it is possible either not to form unevenness on the light entrance-side surface 55b due to the presence of the diffusing component 57 (as shown in FIG. 5) or to form unevenness on the light entrance-side surface 55b due to the presence of the diffusing component 57 in addition to the formation of unevenness by molding.

Figure 6:
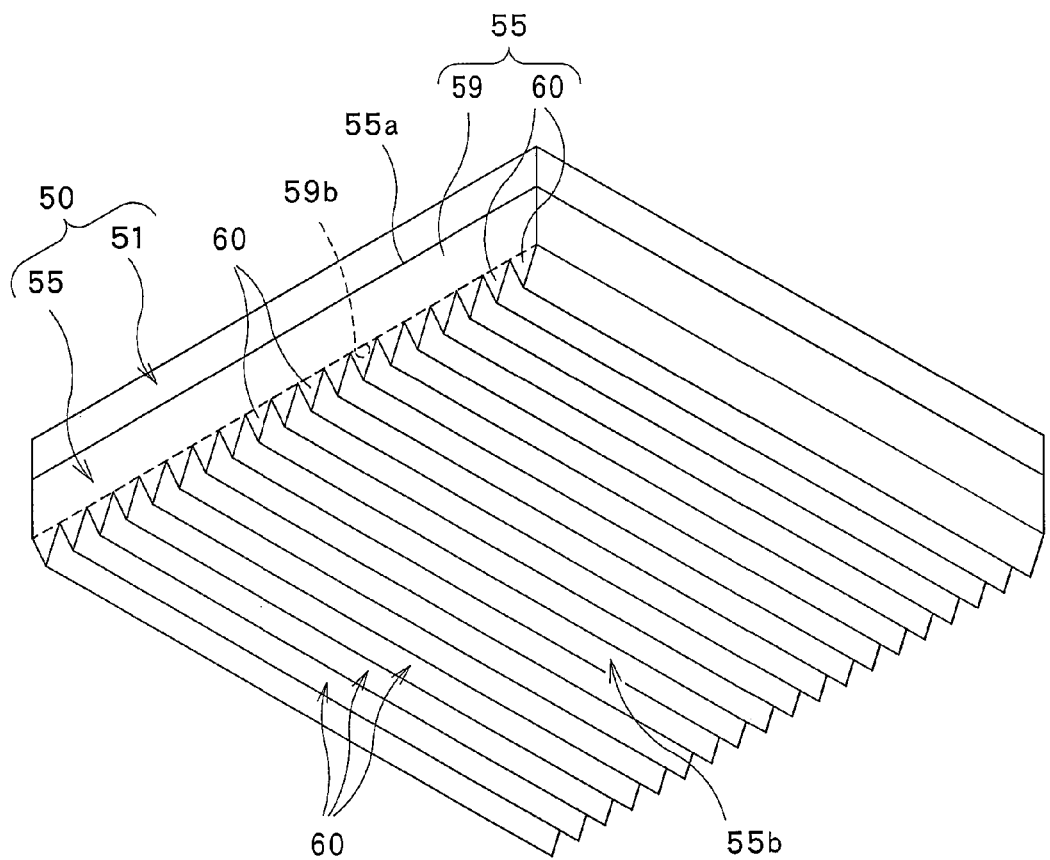
FIG. 6 is a perspective view illustrating another variation of the protective film and the lower polarizing plate.
Figure 7:
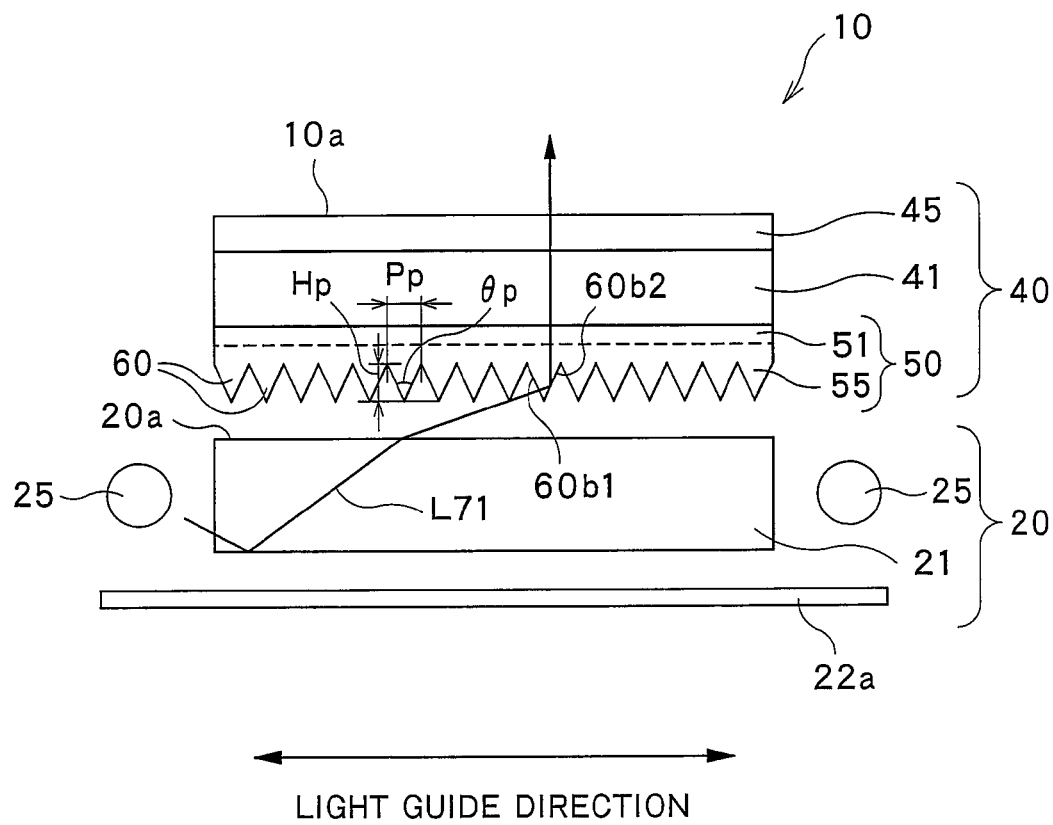
FIG. 7 is a sectional view showing the schematic construction of a display device including the lower polarizing plate of FIG. 6.

As shown in FIGS. 6 and 7, the light entrance-side surface 55b of the protective film 55 may be configured as a prism surface formed by unit prisms 60 arranged side by side. Such protective film 55 can be produced e.g. by using a molding roll 84 having grooves, whose sectional shape conforms to the unit prisms, in the peripheral surface in the above-described method for producing the protective film 55. In the embodiment shown in FIGS. 6 and 7, the protective film 55 consists of a sheet-like body portion 59 and unit prisms 60 arranged parallel to each other on the light entrance-side surface 59b of the body portion 59. Each unit prism 60 extends in a straight line in a direction perpendicular to the arrangement direction of the unit prisms 60. Further, in the embodiment shown in FIGS. 6 and 7, each unit prism 60 has a triangular shape or a generally-triangular shape having a chamfered top apex in a section perpendicular to the longitudinal direction. The protective film 55 having such construction can exert a light condensing effect (light collecting effect).

FIG. 7 shows an exemplary manner of using the protective film 55 having a light condensing function (light collecting function). In the embodiment shown in FIG. 7, the surface light source device 20 is configured as an edge-light type backlight including a light guide plate 21, a light source 25 disposed on both sides of the light guide plate 21, and a reflective sheet 22a disposed behind the light guide plate 21. Light from the light source 25 enters the light guide plate 21 through the side surface (light entrance surface), and travels in the light guide plate 21 along the light guide direction while repeating reflection between the pair of the main surfaces of the light guide plate 21. The light guide plate 21 is provided with a not-shown light takeout element such as, for example, white dots provided on the back surface, facing the reflective sheet 22a, of the light guide plate 21, or a diffusing component dispersed in the light guide plate 21 so that light traveling in the light guide plate 21 will exit the light guide plate 21 toward the viewer side in such a manner that the amount of exiting light is approximately uniform along the light guide direction. As shown by light L71 in FIG. 7, light mostly exits the light guide plate 21 in a direction highly inclined from the front direction nd.

The protective film 55 is positioned with respect to the light guide plate 21 such that the arrangement direction of the unit prisms 60 is parallel to the light guide direction of the light guide plate 21. Further, the unit prisms 60 projects from the protective film 55 toward the light guide plate 21. Light L71, traveling toward the liquid crystal display panel along a direction highly inclined from the front direction nd, enters the protective film 55 through one surface 60b1 of a unit prism 60, and thereafter is reflected (in particular totally reflected) on the other surface 60b2 of the unit prism 60 and changes its travel direction toward the front direction nd. In this manner, the protective film 55 can exert a light condensing effect (light collecting effect).

With reference to the thus-constructed unit prisms 60, the arrangement pitch Pp (corresponding to the width of each unit prism 60 in the illustrated embodiment, see FIG. 7) of the unit prisms 60 along the arrangement direction of the unit prisms 60 may be, for example, 5 μm to 200 um. The height Hp (see FIG. 7) of the unit prisms 60 may be, for example, 1 μm to 150 μm. When the sectional shape of each unit prism 60 is an isosceles triangle, the apex angle θp (see FIG. 7) at the top apex lying between the two equal sides and projecting toward the light entrance side may be not less than 2° and not more than 178°, preferably not less than 30° and not more than 120°, more preferably not less than 60° and not more than 90° from the view of intensively enhancing the front direction luminance.

Figure 15:
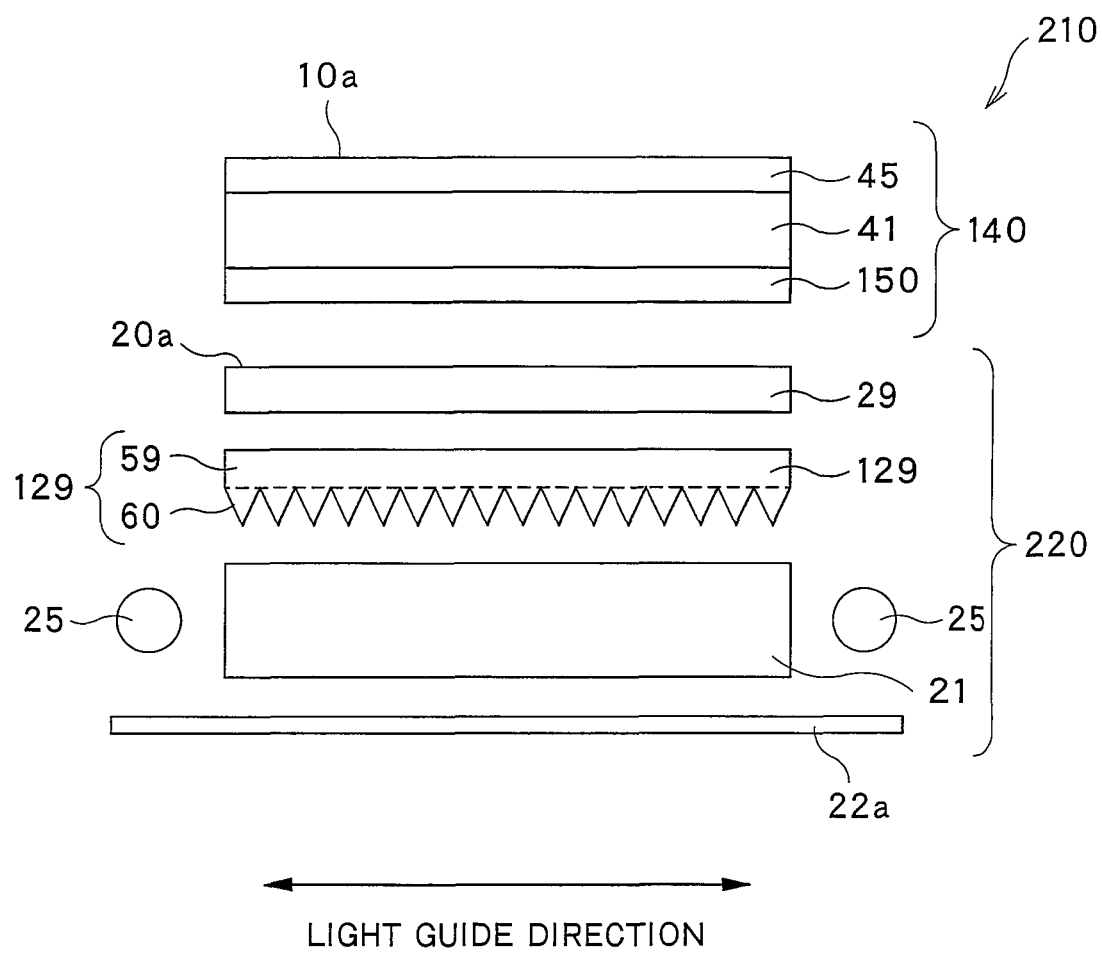
FIG. 15 is a sectional view corresponding to FIG. 7, showing a conventional display device.

On the other hand, as shown in FIG. 15, a conventional edge-light type surface light source device 220, which is used in combination with a liquid crystal display panel 140 including a conventional lower polarizing plate 150, is in most cases provided with a prism sheet (reflective prism sheet, inverted prism sheet) 129 disposed on the light exit side of the light guide plate 21. By designing the protective film 55 to have the same light condensing function as the prism sheet (reflective prism sheet, inverted prism sheet) 129 of the conventional surface light source device 220 shown in FIG. 15, it becomes possible to eliminate the prism sheet 129 from the surface light source device 220 while maintaining the optical characteristics of the overall display apparatus. The conventional surface light source device 220 shown in FIG. 15 is also provided with a diffuser sheet 29 disposed on the light exit side of the prism sheet 129. When the protective film 55 includes the diffusing component 57, by adjusting the degree of the diffusing effect of the protective film 55, attributable to the diffusing component 57, it becomes possible to also eliminate the diffuser sheet 29 as well. Thus, the use of the protective film 55 shown in FIGS. 6 and 7 can significantly reduce the production cost of the display device 10 and can make the display device 10 significantly thinner.

The same reference numerals as used for the above-described display devices are used to indicate the same elements or members of the conventional display device 210 shown in FIG. 15, and a duplicate description thereof is omitted.

The protective film 55 according to the above-described variation is merely one example of a protective film having a light condensing function; various modifications can be made to the variation shown in FIGS. 6 and 7. For example, the protective film having a light condensing function may be incorporated not into an edge-light type surface light source device as shown in FIG. 7 but into a direct-light type surface light source device as shown in FIG. 1. Though the above-described unit prisms (unit optical elements) each have a triangular sectional shape or a generally-triangular sectional shape having a chamfered top apex, it is possible to use unit prisms having some other sectional shape. While the linear arrangement of the linear unit prisms has been described, it is possible to use unit prisms arranged two-dimensionally. Thus, the light entrance-side surface 55a of the protective film 55 may be formed by microlenses (fly's eye lens).

Figure 8:
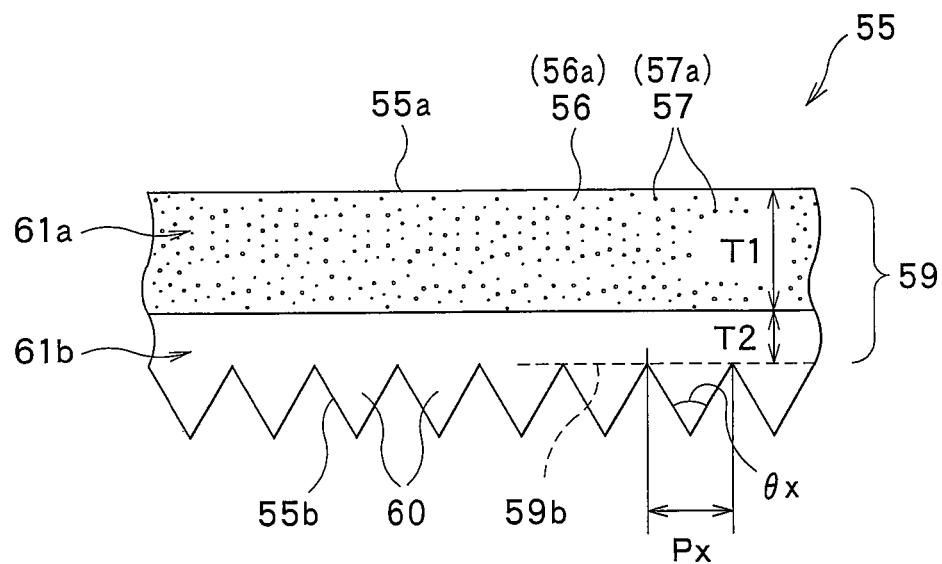
FIG. 8 is a sectional view showing a variation of the protective film shown in FIGS. 6 and 7.
Figure 9:
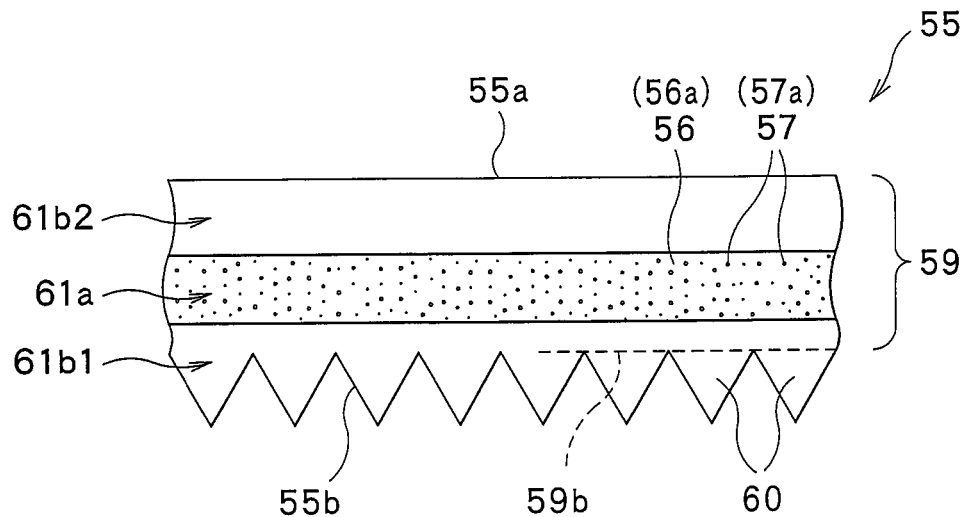
FIG. 9 is a sectional view showing another variation of the protective film shown in FIGS. 6 and 7.

Further, as shown in FIGS. 8 and 9, in addition to a light diffusing portion (light diffusing layer) 61a having the matrix 56 of a resin and the diffusing component 57 dispersed in the matrix 56, the protective film 55 may also include a resin portion (resin layer) 61b having no diffusing component. In the embodiment shown in FIG. 8, the resin portion 61b is disposed on the light entrance side, and the surface of the resin portion 61b defines the light entrance-side surface 55b of the protective film 55. The light diffusing portion 61a is disposed on the light exit side of the resin portion 61b, and the surface of the light diffusing portion 61a defines the light exit-side surface 55a of the protective film 55. In the embodiment shown in FIG. 9, the protective film 55 includes a first resin portion 61b1 disposed on the light entrance side, the light diffusing portion 61a disposed on the light exit side of the first resin portion 61b1, and a second resin portion 61b2 disposed on the light exit side of the light diffusing portion 61a. In the embodiments shown in FIGS. 8 and 9, the unit prisms 60 constitute part of the resin portion 61b or 61b1. Thus, the prism surface is the surface of the resin portion 61b or 61b1 containing no diffusing component. The surface (prism surface) of the unit prisms 60, which serves as a light entrance surface 60b1 and a total reflection surface 60b2, can therefore be formed as a flat surface, not having unevenness due to the diffusing component 57, with high accuracy. This ensures that the unit prisms 60 of the protective film 55 exert the expected optical effect.

The protective film 55 including the light diffusing portion 61a and the resin portion 61b can be produced as an extrudate by the above-described extrusion processing, in particular co-extrusion. In the protective film 55 produced by co-extrusion, no optical interface exits between the matrix 56 of the light diffusing portion 61a and the resin portion 61b. Thus, light from the resin portion 61b, disposed in the light entrance side of the protective film 55, enters the light exit-side light diffusing portion 61a without being subject to an optical action.

The protective film 55 can be produced also by a method other than extrusion, such as injection molding. An exemplary apparatus and method for producing the protective film 55 by molding an ionizing radiation-curable resin into a desired shape will now be described with reference to FIG. 10.

Figure 10:
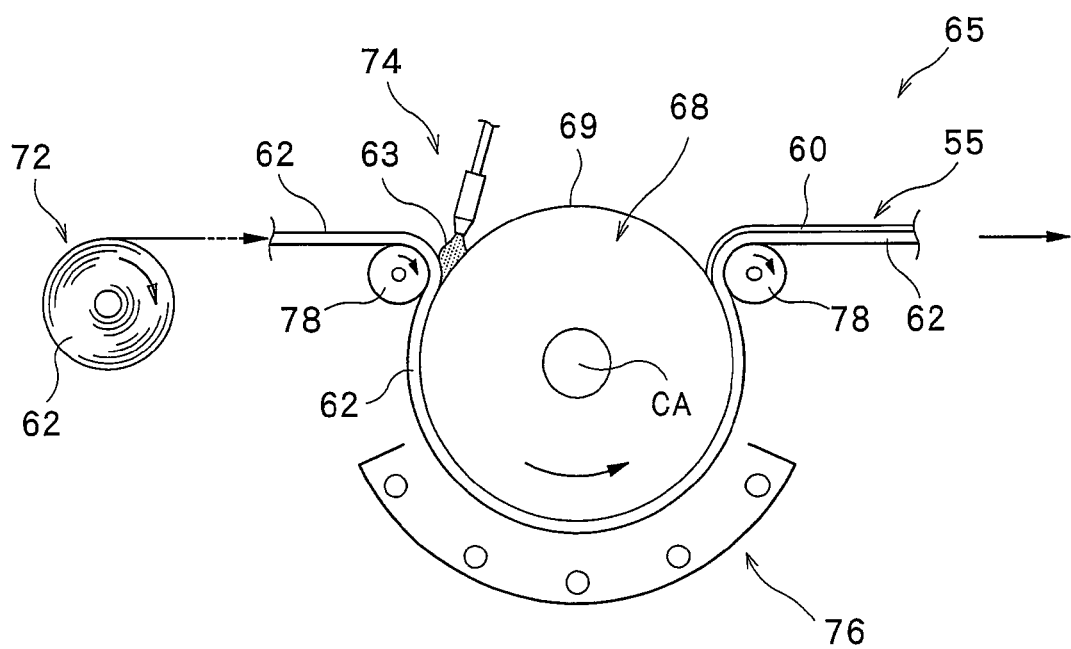
FIG. 10 is a diagram illustrating a variation of the method and apparatus for the production of a protective film.

Unit prisms 60 can be formed on a base film 62 by molding, using a molding apparatus 65 as shown in FIG. 10. A resin which has good moldability and excellent light permeability and is easily available (for example, a transparent cured (crosslinked) product of a composition of a polyfunctional urethane acrylate oligomer and a dipentaerythritol hexaacrylate monomer, having a refractive index of 1.57) can be preferably used as a material in the formation of the unit prisms 60.

The molding apparatus 65 will be described first. As shown in FIG. 10, the molding apparatus 65 includes a mold 68 having a generally-cylindrical contour. The cylindrical mold 68 has, in its peripheral surface (side surface), a cylindrical mold surface (uneven surface) 69. The cylindrical mold 68 has a central axis CA passing through the center of the peripheral surface of the cylinder, in other words, passing through the center of the cross-section of the cylinder. Recesses (not shown) corresponding to the unit prisms 60 of the protective film 55 are formed in the mold surface 69. Thus, the mold 68 is configured as a roll mold which, while rotating about the central axis CA as the axis of rotation (see FIG. 10), molds the protective film 55 as a molded product.

As shown in FIG. 10, the molding apparatus 65 further includes a molding base supply apparatus 72 for supplying a strip-shaped base film 62, a material supply apparatus 74 for supplying a material 63 having fluidity between the base film 62 supplied and the mold surface 69 of the mold 68, and a curing apparatus 76 for curing the material 63 between the base film 62 and the uneven surface 69 of the mold 68. The curing apparatus 76 may be configured appropriately depending on the curing properties of the material 63 to be cured.

A method for producing the protective film 55 by using the molding apparatus 65 will now be described. First, the strip-shaped base film 62 is supplied from the molding base supply apparatus 72. The base film 62 may be, for example, a film comprising a matrix and a diffusing component dispersed in the matrix. Such a film is available as an extrudate. As show in FIG. 10, the base film 62 is fed to the mold 68 and held by the mold 68 and a pair of rollers 78 such that the base film 62 faces the uneven surface 69 of the mold 68.

As shown in FIG. 10, concomitantly with the supply of the base film 62, the material 63 having fluidity is supplied from the material supply apparatus 74 to between the base film 62 and the mold surface 69 of the mold 68. The material 63 is to make the unit prisms 60. The expression "having fluidity" herein means that the material 63, supplied to the mold surface 69 of the mole 68, has such a degree of fluidity as to allow the material to enter the recesses (not shown) in the mold surface 69.

A variety of materials which are known to be usable for molding (for example, an ionizing radiation-curable resin such as the above-described transparent cured (crosslinked) product of a composition of a polyfunctional urethane acrylate oligomer and a dipentaerythritol hexaacrylate monomer, having a refractive index of 1.57) can be used as the material 63. In this embodiment, an ionizing radiation-curable resin is supplied from the material supply apparatus 74. A UV-curable resin to be cured by ultraviolet (UV) irradiation or an EB-curable resin to be cured by electron beam (EB) irradiation, for example, may be used as an ionizing radiation-curable resin.

With an ionizing radiation-curable resin present between the base film 62 and the mold surface 69 of the mold 68, the base film 62 as a molding base passes by the curing apparatus 76. Ionizing radiation having a wavelength suited for the curing properties of the ionizing radiation-curable resin 63 is continually emitted from the curing apparatus 76. The ionizing radiation passes through the base film 62 and is applied to the ionizing radiation-curable resin 63. When the ionizing radiation-curable resin 63 is a UV-curable resin, the curing apparatus 76 may be configured as a UV irradiation apparatus such as a high-pressure mercury lamp. The curing apparatus 76 cures the ionizing radiation-curable resin 63 between the mold surface 69 and the base film 62 to form unit prisms 60, made of the cured ionizing radiation-curable resin, on the base film 62.

Thereafter, as shown in FIG. 10, the base film 62 is detached from the mold 68 by the right roller 78, and the unit prisms 60 formed in the recesses in the mold surface 69 are separated from the mold 68 along with the base film 62. In this manner, the above-described protective film 55 is produced.

When the base film 62 does not make contact with the surface 69 of the mold 68 in the above-described production method, the body portion 59 of the protective film 55 produced is composed of the base film 62 and the sheet-like cured resin portion (land portion) bonded to the base film 62. This method can effectively prevent the molded unit prisms 60 from partly remaining in the recesses of the mold 69 upon detachment of the unit prisms 60 from the mold 69.

While the roll mold 68 rotates 360 degrees on the central axis CA, the step of supplying the material 63 having fluidity into the mold 68, the step of curing the material 63 in the mold 68 and the step of drawing the cured material 63 from the mold 68 are carried out sequentially on the mold surface 69 of the mold 68 in the above-described manner to produce the protective film 55.

When in the production method described above with reference to FIG. 10, the base film 62 to be supplied from the molding base supply apparatus 72 is a film containing a diffusing component, e.g. an extrudate containing a diffusing component, and the material 63 to be supplied from the material supply apparatus 74 contains no diffusing component, the protective film shown in FIG. 8, composed of the resin portion 61b having the prism surface and the light diffusing portion 61a disposed on the light exit side of the resin portion 61b, can be obtained. In this case, the light diffusing portion 61a of the protective film 55 is formed of the base film 62, while the resin portion 61b of the protective film 55 is formed from the material 63 supplied from the material supply apparatus 74.

When the base film 62, onto which the ionizing radiation-curable resin material 63 is supplied, is a film material composed of a resin portion and a light diffusing portion, the protective film 55 shown in FIG. 9 can be produced. For example, the protective film 55 of FIG. 9 can be produced by using, as the base film 62 to be supplied from the molding base supply apparatus 72, an extrudate produced by co-extrusion, composed of a resin portion and a light diffusing portion. In this case, the light diffusing portion 61a and the second resin portion 61b2 of the resulting protective film 55 is formed of the extrudate, while the first resin portion 61b1 of the resulting protective film 55 is formed from the ionizing radiation-curable resin material 63 supplied from the material supply apparatus 74.

In another example, the base film 62 to be supplied from the molding base supply apparatus 72 may be a film material produced by forming a mat layer (mat portion), including a diffusing component 57 and a resin material (e.g. an ionizing radiation-curable resin or a thermosetting resin) as a binder resin, on a transparent film. In this example, the resin material as a binder resin of the mat layer serves as a matrix 56, and the mat layer makes the light diffusing portion 61a of the protective film 55. The transparent film which, together with the mat layer, constitutes the base film 62 makes the second resin portion 61b2 of the protective film 55. The first resin portion 61b1 of the protective film 55 is formed from the ionizing radiation-curable resin material 63 supplied from the material supply apparatus 74. In the embodiment shown in FIG. 9, a thermosetting resin having a refractive index of 1.56 or a UV-curable resin having a refractive index of 1.51 may be used as a resin material for the matrix 56 of the light diffusing layer 61a. The refractive index of a thermosetting resin or a UV-curable resin for the matrix 56, however, may be suitably determined depending on the differences in the refractive index from the adjacent resin layers 61b1, 61b2 and the optical properties of the resin layers 61b1, 61b2.

Though in the above-described embodiment the lower polarizing plate 50 is composed of the polarizer 51 and the protective film 55 bonded to the light entrance side of the polarizer 51, it is possible to provide a protective film also on the light exit side of the polarizer 51. In some cases, a retardation plate (wave plate) for compensating for a phase difference of light is provided between the lower polarizing plate 50 and the liquid crystal cell 41. In that case, the protective film on the light exit side of the lower polarizing plate 50 may serve also as a protective film on the light entrance side of the retardation plate.

Though in the above-described embodiment the light emitters 25a of the light source 25 are comprised of the linear cold cathode fluorescent lamps, it is possible to use other types of light emitters, such as point-like LEDs (light emitting diodes), a planar EL (electroluminescent) emitter, etc., for the light source 25. Though in the above-described embodiment the protective film 55, the lower polarizing plate 50 and the liquid crystal display panel 40 are used in combination with the direct-light type surface light source device 20, it is possible to use the protective film 55, the lower polarizing plate 50 and the liquid crystal display panel 40 in combination with an edge-light type (also called side-light type, or the like) surface light source device as described above with reference to FIGS. 6 and 7.

The above-described overall construction of the surface light source device 20 and the transmissive display device 10 is merely an example, and the present invention is not limited to the construction. For example, it is possible to incorporate an additional optical sheet(s), such as a reflection-type polarization separation film, into the surface light source device 20 and the transmissive display device 10, or to eliminate or replace with some other sheet-like member(s) at least one of the sheet-like members including the light condensing sheets 30, 35.

The above-described modifications may also be made in an appropriate combination to the above-described embodiments.

EXAMPLES

The following examples illustrate the present invention in greater detail and are not intended to limit the invention in any manner.

<Research 1>

Using the apparatus described above with reference to FIG. 4, a thermoplastic resin with particulate matter were heated and extruded in accordance with the method described above with reference to FIG. 4 to produce a protective film including a matrix of the thermoplastic resin and a diffusing component of the particulate matter dispersed in the matrix. A plurality of protective films were produced under varying production conditions. The protective films produced were subjected to measurements to determine the roughness Ra of the surface which had been in contact with the belt member and the roughness Ra of the surface which had been in contact with the molding roll, the presence or absence of deformation such as warpage or bending, and property of bonding to a polarizer by water bonding.

[The Construction of the Protective Films and the Production Method]

The protective films were each composed solely of a layer including the matrix of the thermoplastic resin and the diffusing component of the particulate matter dispersed in the matrix. For each protective film, a polycarbonate resin was used as the thermoplastic resin, and fine styrene particles were used as the particulate matter. The average particle size (primary particle size) of the fine styrene particles was 5 μm, and the content of the particles in each protective film was 15% by weight. The thickness of each protective film was 80 μm.

The protective films were produced under the varying conditions of: the length L [unit: mm], along the traveling path of the film material, of the zone NZ (see FIG. 4) in which the film material is pressed between the molding roll and the belt member; the traveling speed F [unit: m/min] (equal to the extrusion speed) of the film material; and the temperature T [unit: °C.] of the belt member. The conditions employed in the production of the protective films are shown in Table 1 below. Table 1 also shows whether the production conditions (the length L of the pressing zone, the traveling speed F of the film material and the temperature T of the belt member) satisfy the above-described formula (b):

$$0.16 \leq L/(F \times T) \times 100 \leq 0.96 \tag{b}$$

The other production conditions were common to all the protective films, as follows:
Heating temperature in the extruder: 300° C.
Temperature of the molding roll: 135° C.
Pressure (linear pressure) between the molding roll and the nip roll of the backup means: 16 kgf/mm

[Evaluation]

For the protective films produced, the roughness of the surface (belt-side surface) which had been in contact with the belt member and the roughness of the surface (roll-side surface) which had been in contact with the molding roll were measured in terms of the center line average roughness Ra in accordance with JIS B0601 (1982). The results of the measurement of the roughness Ra are shown in Table 1.

Deformation, such as warpage or bending, of the protective films was evaluated. A film sample which was deformed to such a degree as to cause a problem in practical use of the protective film in a lower polarizing plate was evaluated as "×", while a film sample which was not deformed to such a degree as to cause a problem was evaluated as "○". The evaluation results are shown in Table 1.

Bonding of each protective film to a polarizer by water bonding was evaluated. A polyvinyl alcohol film was used as the polarizer. Light absorption anisotropy had been imparted to the polyvinyl alcohol film by adsorbing iodine onto the film, followed by uniaxial stretching for orientation of the film. A film sample which could be bonded to the polarizer without entrainment of air or foreign matter when the sample was water-bonded to the polarizer according to the common procedure (conditions) was evaluated as "○", while a film sample in which entrainment of air or foreign matter occurred upon water bonding of the sample to the polarizer was evaluated as "×".

TABLE 1

Production Conditions and Evaluation Results for Protective Films

| | Conditions | | | | | Ra (μm) | | | |
|---|---|---|---|---|---|---|---|---|---|
| Sample | T (° C.) | F (m/min) | L (mm) | (L/(F × T)) × 100 | Conditional formula | Roll-side surface | Belt-side surface | Deformation | Water Bonding |
| 1 | 90 | 20 | 40 | 0.13 | X | 0.34 | 1.20 | ○ | X |
| 2 | 90 | 20 | 49 | 0.16 | ○ | 0.05 | 0.90 | ○ | ○ |
| 3 | 90 | 15 | 49 | 0.22 | ○ | 0.04 | 0.68 | ○ | ○ |
| 4 | 75 | 15 | 49 | 0.26 | ○ | 0.04 | 0.56 | ○ | ○ |
| 5 | 75 | 15 | 58 | 0.31 | ○ | 0.03 | 0.35 | ○ | ○ |
| 6 | 50 | 15 | 58 | 0.46 | ○ | 0.03 | 0.21 | ○ | ○ |
| 7 | 50 | 15 | 80 | 0.64 | ○ | 0.03 | 0.18 | ○ | ○ |
| 8 | 50 | 10 | 80 | 0.96 | ○ | 0.03 | 0.14 | ○ | ○ |
| 9 | 50 | 8 | 80 | 1.20 | X | 0.03 | 0.10 | X | ○ |

<Research 2>

A display device according to Example and a display device according to Comparative Example were produced, and their optical characteristics were compared. The display devices were produced in the following manner.

[Display Device]

Example

A display device having the construction shown in FIG. 1 was produced as a display device according to Example. As the light source and the reflector of the surface light source device were used those incorporated in a commercially available liquid crystal display television (32-inch AQUOS, manufactured by Sharp Corporation). A diffuser plate (haze value: 88%, overall light transmittance: 55%) manufactured by Sumitomo Chemical Co., Ltd. was used as the diffuser plate of the surface light source device. Two identical optical sheets (UPVII, manufactured by Dai Nippon Printing Co., Ltd.) were used as the first and second light condensing sheets and, as in the above-described embodiment, were disposed such that the arrangement directions of the unit optical elements of the two optical sheets were perpendicular to each other.

A liquid crystal cell, incorporated in the commercially available liquid crystal display television (32-inch AQUOS, manufactured by Sharp Corporation), was used as the liquid crystal cell of the liquid crystal display panel. A polarizing plate, including a polarizer and a pair of protective films water-bonded to both surfaces of the polarizer, was used as the upper polarizing plate. A polyvinyl alcohol film was used as the polarizer of the upper polarizing plate. Light absorption anisotropy had been imparted to the polyvinyl alcohol film by adsorbing iodine onto the film, followed by uniaxial stretching for orientation of the film. Triacetyl cellulose films (TAC films) were used as the pair of protective films of the upper polarizing pate.

As the lower polarizing plate was used a polarizing plate including a polarizer, a protective film disposed on the light entrance side of the polarizer, and a protective film disposed on the light exit side of the polarizer. The polarizer of the lower polarizing plate was the same as the polarizer of the upper polarizing plate. An extruded polycarbonate film containing no diffusing component was used as the light exit-side protective film of the lower polarizing plate. The polycarbonate film was laminated onto the polarizer by water bonding.

On the other hand, the sample 5 produced in the above-described Research 1 was used as the protective film laminated on the light entrance side of the polarizer of the lower polarizing plate. The haze value of the light entrance-side protective film of the lower polarizing plate was found to be 86.2%. Further, the light entrance-side protective film for the lower polarizing plate, produced by extrusion processing and having a thickness of 80 μm, was found to have a moisture permeability of 60 g/m²·24 hr, as measured at a temperature of 40° C. and a humidity of 90% RH for 24 hours.

Comparative Example

A display device having the construction shown in FIG. 14 was produced as a comparative display device of Comparative Example. The display deice of Comparative Example has the same construction and uses the same materials as the display device of Example except that a diffuser sheet (manufacture by Keiwa Inc.) having a haze value of 87% was provided on the light exit side of the light exit-side light condensing sheet in the surface light source device, and that a triacetyl cellulose film (TAC film) was used as the light entrance-side protective film of the lower polarizing plate of the liquid crystal display panel.

[Evaluation Method]

Figure 11:
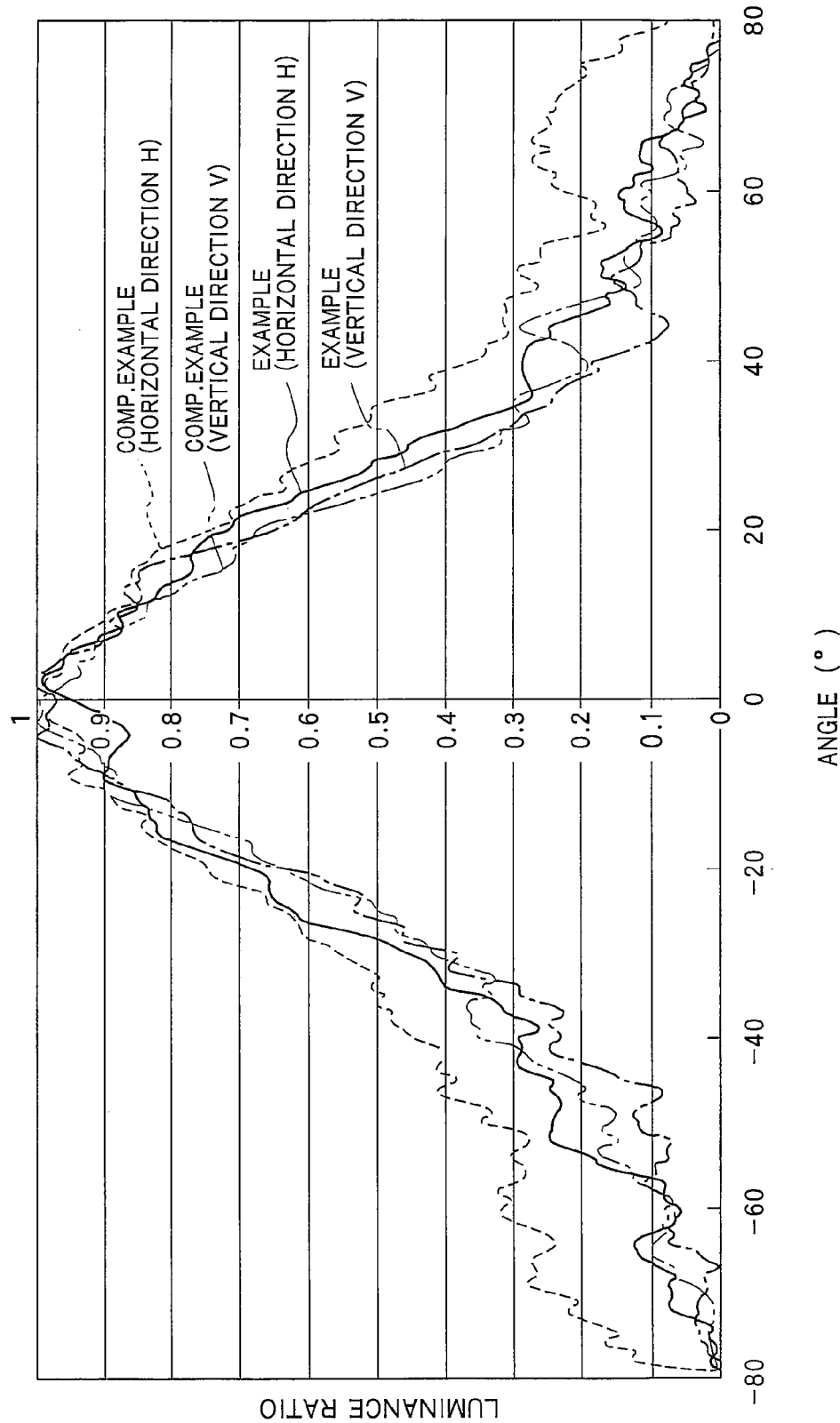
FIG. 11 is a graph showing the angular distributions of the ratio of luminance to the front-direction luminance, determined for display devices of Example and Comparative Example.

While displaying a white color on the entire display surface of each display device, the angular distribution of luminance was measured. The measurement results are shown in FIG. 11. BM-9, manufactured by Topcon Corporation, was used for the measurement of the angular distribution of luminance. With reference to the angular distribution of luminance, the distribution of luminance in a horizontal direction H was determined by measuring the luminance in varying directions in a plane parallel to both the front direction and the arrangement direction of the unit optical elements of the light entrance-side light condensing sheet. Further, the distribution of luminance in a vertical direction V was determined by measuring the luminance in varying directions in a plane parallel to both the front direction and the arrangement direction of the unit optical elements of the light exit-side light condensing sheet (arrangement direction of the cold-cathode fluorescent lamps).

The front-direction luminance of the display device of Example was found to be 107% of the front-direction luminance of the display device of Comparative Example. The half-value angle in the angular distribution of luminance was as follows. The half-value angle refers to the angle of inclination, with respect to the front direction, of a measurement direction in which the measured luminance is one-half of the peak front-direction luminance. For the display device of Example, the half-value angle in the horizontal-direction angular distribution of luminance H was 29°, and the half-value angle in the vertical-direction angular distribution of luminance V was 26°. For the display device of Comparative Example, on the other hand, the half-value angle in the horizontal-direction angular distribution of luminance H was 34°, and the half-value angle in the vertical-direction angular distribution of luminance V was 24°.

<Research 3>

A simulation of luminance characteristics was performed on a model in which the protective film shown in FIG. 8 is applied in the display device shown in FIG. 7. The simulation was performed on six display device models, samples A1 to A3 and samples B1 to B3. The samples A1 to A3 and B1 to B3 differ from one another only in the protective film; the other components are the same among them. For the components, other than the protective film, of each display device model, the specifications of relevant components incorporated into a commercially available liquid crystal display device were employed.

Protective films, comprising a light diffusing portion (light diffusing layer) and a resin portion (resin layer) formed by co-extrusion, were set as the protective films of the samples A1 to A3. Protective films, produced by molding of an ionizing radiation-curable resin on a base film by the method described above with reference to FIG. 10, were set as the protective films of the samples B1 to B3. In the protective films of the samples A1 to A3 and B1 to B3, the thickness T1 (see FIG. 8) of the light diffusing portion (light diffusing layer) was set at 80 μm, and the thickness T2 (see FIG. 8) of a portion, forming the body portion, of the resin portion (resin layer) (corresponding to the land portion in the samples B1 to B3) was set at 10 μm.

In the protective films of the samples B1 to B3, the sectional shape of each unit prism was set as a isosceles triangle which is symmetrical with respect to the front-direction center line. In the protective films of the samples B1 to B3, the arrangement pitch Px (see FIG. 8) of the unit prisms (equal to the width of each unit prism) was set at 150 μm, and the apex angle θx (see FIG. 8) of each unit prism projecting toward the light entrance side was set at 66°. With reference to the protective films of the samples A1 to A3, the same unit prisms as those of the protective films of the samples B1 to B3 were set but at a molding rate of 97%. Thus, each unit prism of the protective films of the samples A1 to A3 has the same shape as each unit prism of the protective films of the samples B1 to B3, but has a rounded apex which makes the height of the unit prisms of the protective films of the samples A1 to A3 equal to 97% of the height of the unit prisms of the protective films of the samples B1 to B3.

With reference to the samples A1 to A3, the refractive index of the matrix of the light diffusing portion and the refractive index of the resin portion were both set at 1.59. With reference to the samples B1 to B3, the refractive index of the matrix of the light diffusing portion was set at 1.59, and the refractive index of the resin portion was set at 1.51.

With reference to the sample A1 and the sample B1, the haze value of the light diffusing portion of the protective film was set at 49.0(%). With reference to the sample A2 and the sample B2, the haze value of the light diffusing portion of the protective film was set at 88.7(%). With reference to the sample A3 and the sample B3, the haze value of the light diffusing portion of the protective film was set at 99.4(%). The haze value herein refers to that defined by JIS K7150.

Figure 12:
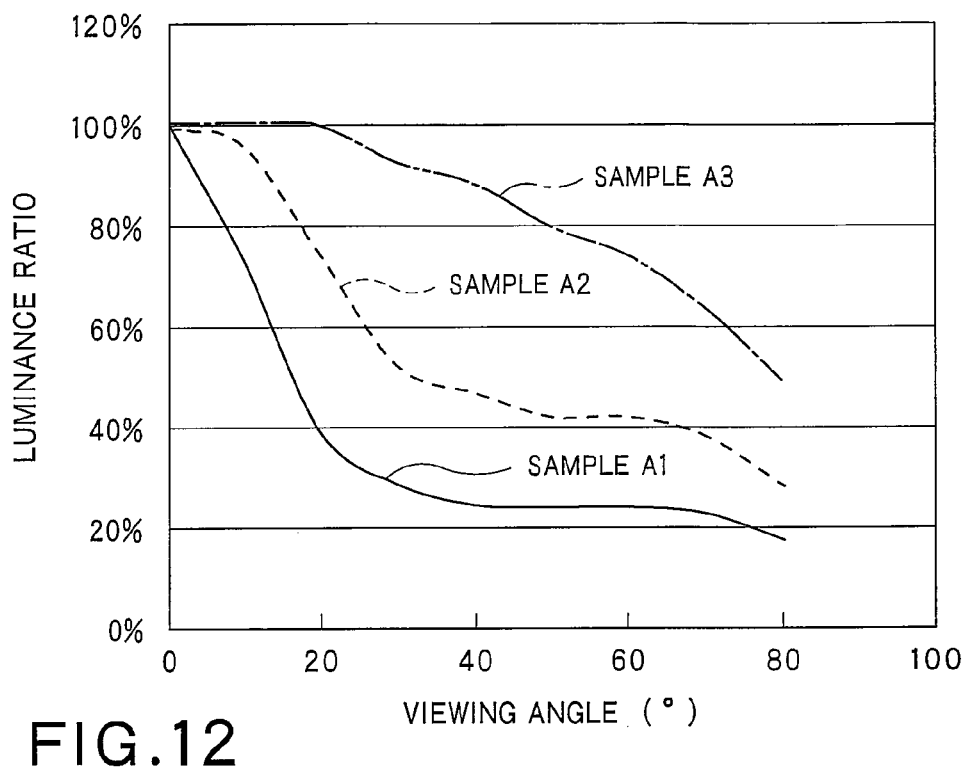
FIG. 12 is a graph showing the angular distributions of the ratio of luminance to the front-direction luminance, determined for display devices of samples A1 to A3.
Figure 13:
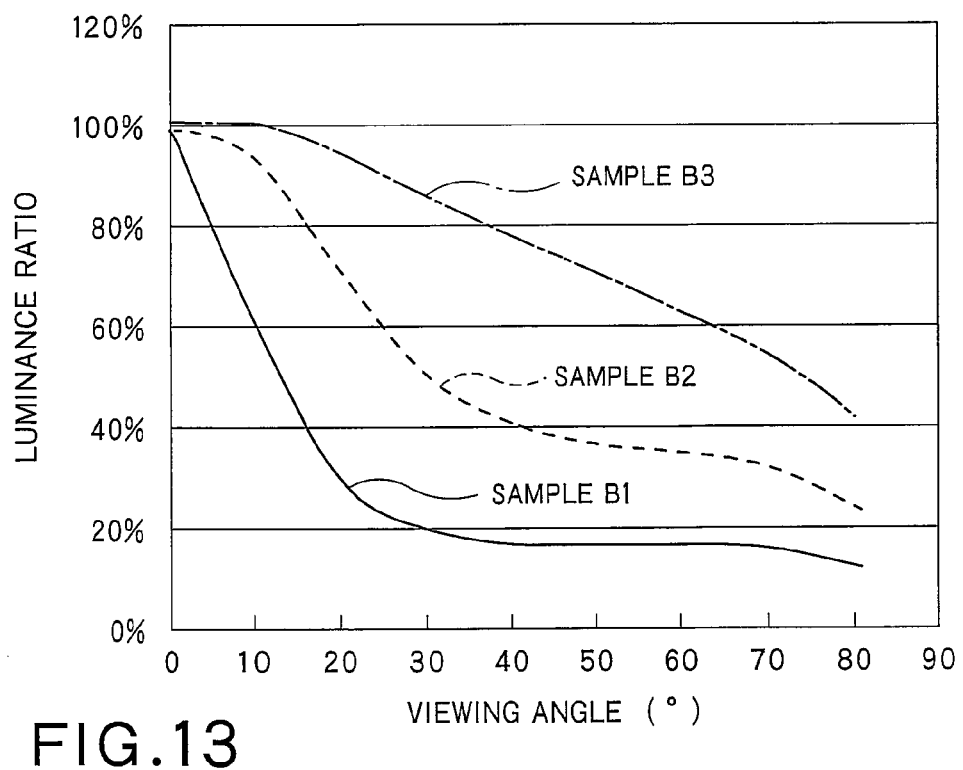
FIG. 13 is a graph showing the angular distributions of the ratio of luminance to the front-direction luminance, determined for display devices of samples B1 to B3.

For the samples A1 to A3 and B1 to B3, the angular distribution of luminance on the display surface was simulated. The angular distribution of luminance was determined by simulating the luminance in varying directions in a plane parallel to both the arrangement direction of the unit prisms and the normal direction of the display surface of the display panel. FIG. 12 shows the angular distributions of luminance for the samples A1 to A3, and FIG. 13 shows the angular distributions of luminance for the samples B1 to B3. Among the samples A1 to A3, the sample A1 was found to exhibit the highest front-direction luminance, and the sample A3 was found to exhibit the lowest front-direction luminance. Among the samples B1 to B3, the sample B1 was found to exhibit the highest front-direction luminance, and the sample B3 was found to exhibit the lowest front-direction luminance. The simulation results thus indicate that the luminance characteristics of a display device can be significantly changed by adjusting the degree of the light diffusing effect of a protective film.

What is claimed is:

1. A protective film for a lower polarizing plate comprising:
   a matrix of a resin material;
   a diffusing component dispersed in the matrix;
   a light diffusing portion including the diffusing component; and
   a resin portion including no diffusion component;
   wherein the protective film for a lower polarizing plate is bonded to a polarizer to form a lower polarizing plate for a liquid crystal display panel;
   wherein at least one-side surface of the protective film, which faces the polarizer, is flat, and wherein the other-side surface opposite to the one-side surface is a prism surface formed by arranged unit prisms; and
   wherein the unit prisms are included in the resin portion, and the light diffusing portion is disposed between the polarizer and the resin portion.

2. The protective film according to claim 1,
   wherein the unit prisms are arranged in an arrangement direction parallel to a film plane of the protective film, and each unit prism extends in a direction which is parallel to the film plane and which intersects the arrangement direction.

3. The protective film according to claim 1, further comprising:
   a second resin portion including no diffusing component disposed between the polarizer and the light diffusing portion.

4. The protective film according to claim 1, wherein the other-side surface opposite to the one-side surface has unevenness formed due to the presence of the diffusing component.

5. The protective film according to claim 1, wherein the other-side surface opposite to the one-side surface has unevenness formed by molding.

6. The protective film according to claim 1, wherein the protective film is an extrudate produced by extrusion processing.

7. The protective film according to claim 1, wherein the protective film has a haze value of not less than 60%.

8. The protective film according to claim 1, wherein the protective film has a moisture permeability of not less than 10 g/m$^2$·24 hr, as measured at a temperature of 40° C. and a humidity of 90% RH for 24 hours.

9. A lower polarizing plate comprising:
   a polarizer; and
   the protective film according to claim 1, bonded to the light entrance side of the polarizer,
   wherein the lower polarizing plate is to be incorporated into a liquid crystal display panel.

10. The lower polarizing plate according to claim 9, further comprising
    an adhesive layer, provided adjacent to the polarizer and to the protective film, for bonding the polarizer and the protective film together.

11. A liquid crystal display panel comprising:
the lower polarizing plate according to claim 9.

12. A display device comprising:
the liquid crystal display panel according to claim 11; and
a surface light source device for illuminating the liquid crystal display panel from a back side.

* * * * *